US012630705B2

(12) United States Patent
Mulik et al.

(10) Patent No.: US 12,630,705 B2
(45) Date of Patent: May 19, 2026

(54) BINDER COMPOSITIONS AND COMPOSITE

(71) Applicant: Bakelite Chemicals LLC, Penarth (GB)

(72) Inventors: Sudhir Mulik, Malvern, PA (US); Robert Breyer, Lilburn, GA (US); Cornel Hagiopol, Lilburn, GA (US); Robert Miller, Atlanta, GA (US)

(73) Assignee: BAKELITE CHEMICALS LLC (GB)

( * ) Notice: Subject to any disclaimer, the term of this patent is extended or adjusted under 35 U.S.C. 154(b) by 782 days.

(21) Appl. No.: 17/794,436

(22) PCT Filed: Jan. 20, 2021

(86) PCT No.: PCT/IB2021/050430

§ 371 (c)(1),
(2) Date: Jul. 21, 2022

(87) PCT Pub. No.: WO2021/148964

PCT Pub. Date: Jul. 29, 2021

(65) Prior Publication Data

US 2023/0086996 A1 Mar. 23, 2023

Related U.S. Application Data

(60) Provisional application No. 62/965,222, filed on Jan. 24, 2020.

(51) Int. Cl.
*C08L 61/06* (2006.01)

(52) U.S. Cl.
CPC .................................... *C08L 61/06* (2013.01)

(58) Field of Classification Search
CPC .......... C08L 61/06; C08L 61/24; C08L 61/28; C08K 5/19; C08K 5/21
See application file for complete search history.

(56) References Cited

U.S. PATENT DOCUMENTS

| | | | | | |
|---|---|---|---|---|---|
| 4,104,443 | A * | 8/1978 | Latta | D06M 15/423 | 428/524 |
| 4,589,954 | A * | 5/1986 | Berbeco | H01B 1/24 | 162/158 |
| 5,032,642 | A | 7/1991 | Lemon et al. | | |
| 5,795,933 | A | 8/1998 | Sharp et al. | | |
| 2004/0082713 | A1* | 4/2004 | Tutin | C08L 61/14 | 524/596 |
| 2013/0327250 | A1* | 12/2013 | Shooshtari | C08L 1/00 | 106/217.5 |
| 2014/0342144 | A1* | 11/2014 | Nakayama | C08J 5/248 | 428/220 |
| 2016/0040006 | A1* | 2/2016 | Harriman | C08K 3/28 | 524/542 |

FOREIGN PATENT DOCUMENTS

| | | |
|---|---|---|
| JP | 2005075938 | 3/2005 |
| JP | 2006273899 | 10/2006 |

* cited by examiner

*Primary Examiner* — Alicia Bland
(74) *Attorney, Agent, or Firm* — Edmonds & Cmaidalka, P.C.

(57) ABSTRACT

Binder compositions and processes for making and using same. In some embodiments, the binder composition can include a urea-based compound, a bifunctional quaternary ammonium salt, and an aldehyde-based resin. In some embodiments, a resinated substrate can include a plurality of substrates and the binder composition. In some embodiments, a process for making a composite product can include contacting a plurality of substrates with the binder composition. The process can also include heating the resinated substrate to at least partially cure the aldehyde-based resin to produce the composite product. In some embodiments, a composite product can include the plurality of substrates and the aldehyde-based resin at least partially cured. In some embodiments, the plurality of substrates can include lignocellulosic substrates. In other embodiments, the plurality of substrates can include glass fibers.

19 Claims, No Drawings

BINDER COMPOSITIONS AND COMPOSITE

CROSS-REFERENCE TO RELATED APPLICATION

This application is a national stage application of International Application No. PCT/IB2021/050430, filed on Jan. 20, 2021, which claims to U.S. Provisional Patent Application No. 62/965,222, filed on Jan. 24, 2020, which is incorporated by reference herein.

BACKGROUND

Field

Embodiments described generally relate to binder compositions and processes for making and using same. More particularly, such embodiments relate to binder compositions that include a urea-based compound, a bifunctional quaternary ammonium salt, and an aldehyde-based resin and processes for making and using same.

Description of the Related Art

Typical adhesives used in the production of composite lignocellulosic products, e.g., particle board, medium density fiberboard, and plywood, and fiberglass composite products, e.g., fiberglass insulation and fiberglass mats, include aldehyde-based resins such as urea-formaldehyde ("UF"), melamine-formaldehyde ("MF"), and melamine-urea-formaldehyde ("MUF") resins. While these resins can produce composite products having desirable properties, these resins can also release formaldehyde into the environment during the production of the resin, the curing of the resin, the lifespan of the composite products, and the incineration or other process used to dispose of the composite products.

Various techniques have been used to reduce the amount of aldehyde compound(s) released from aldehyde-based resins and composite products made therewith. One such technique is the addition of an aldehyde scavenger, e.g., urea, to the aldehyde-based resin. For example, urea in the form of an aqueous solution can be used as an aldehyde scavenger. Urea solutions having a high concentration of urea, e.g., greater than 45 wt % aqueous urea solution, however, are susceptible to having the urea precipitate out of solution and it is generally undesirable to use solutions having lower concentrations of urea because of the increased amount of water associated therewith. Additionally, an aqueous urea solution containing more than 45 wt % of urea when exposed to a cold enough temperature needs external heating to keep the urea solvated in the water.

There is a need, therefore, for improved binder compositions and processes for making and using same.

SUMMARY

Binder compositions and processes for making and using same are provided. In some embodiments, the binder composition can include a urea-based compound, a bifunctional quaternary ammonium salt, and an aldehyde-based resin.

In some embodiments, a resinated substrate can include a plurality of substrates and a binder composition. The binder composition can include a urea-based compound, a bifunctional quaternary ammonium salt, and an aldehyde-based resin.

In some embodiments, a composite product can include a plurality of substrates and an at least partially cured binder composition. Prior to curing, the binder composition can include a urea-based compound, a bifunctional quaternary ammonium salt, and an aldehyde-based resin.

In some embodiments, a process for making a composite product can include contacting a plurality of substrates with a binder composition to produce a resinated substrate. The binder composition can include a urea-based compound, a bifunctional quaternary ammonium salt, and an aldehyde-based resin. The process can also include heating the resinated substrate to at least partially cure the aldehyde-based resin to produce the composite product.

DETAILED DESCRIPTION

It has been surprisingly and unexpectedly discovered that a mixture of one or more urea-based compounds and one or more bifunctional quaternary ammonium salts can be an effective aldehyde scavenger that can introduce a relatively minimal amount of liquid medium or even no liquid medium, e.g., water, into a binder composition produced by mixing, blending, or otherwise combining the urea-based compound, the bifunctional quaternary ammonium salt, and an aldehyde-based resin. In some embodiments, a mixture of the urea-based compound and the bifunctional quaternary ammonium salt can include up to 100 wt % of solids, thus reducing or eliminating the addition of any liquid medium such as water via the addition of the aldehyde scavenger to the aldehyde-based resin to produce the binder composition. The binder composition that includes the urea-based compound, the bifunctional quaternary ammonium salt, and the aldehyde-based resin can have reduced aldehyde emissions as compared to the same aldehyde-based resin with or without the urea-based compound, and without the bifunctional quaternary ammonium salt. The binder composition can be used to make composite products such as composite lignocellulosic products, composite fiberglass products, laminate products, and the like.

It has also been surprisingly and unexpectedly discovered that composite lignocellulosic products can be made with the binder composition that includes the urea-based compound, the bifunctional quaternary ammonium salt, and the aldehyde-based resin that have greater internal bond strength as compared to a comparative composite lignocellulosic product made with the same aldehyde-based resin, but with a conventional aqueous urea solution having the same amount of urea on a weight percent basis as the aldehyde scavenger and without the bifunctional quaternary ammonium salt. Additionally, the increased internal bond strength was found to be statistically significant. As such, the use of the urea-based compound and the bifunctional quaternary ammonium salt, as disclosed herein, can allow for faster press speeds during production of composite products, the use of a substrate, e.g., lignocellulosic substrates, having an increased moisture content, and/or can be used with higher total formaldehyde to total urea molar ratio resins to improve press speed, to improve physical properties, and/or to produce composite products more consistently.

Urea-Based Compound and Ammonium Salt

The urea-based compound can be or can include urea, one or more compounds derived from urea, or any mixture thereof. In some embodiments, the urea-based compound, can be or can include, but is not limited to, urea, methylurea, 1,3-dimethyl urea, 1,1-dimethyl urea, 1,1,3-trimethylurea, 1,1,3,3-tetramethylurea, methylolurea, dimethylolurea, trimethylolurea, tetramethylolurea, or any mixture thereof. In some embodiments, the urea-based compound can be or can include urea. In other embodiments, the urea-based compound can be or can include urea and at least one of methylurea, 1,3-dimethyl urea, 1,1-dimethyl urea, 1,1,3-trimethylurea, 1,1,3,3-tetramethylurea, methylolurea, dimethylolurea, trimethylolurea, tetramethylolurea.

The bifunctional quaternary ammonium salt can be or can include, but is not limited to, 2-hydroxy-N,N,N-trimethylethanaminium chloride, ethylammonium chloride, acetylcholine chloride, tetramethylammonium chloride, diethyl(2-hydroxyethyl)methylammonium chloride, 2-diethylamino ethanol hydrogen chloride, tetraethylammonium chloride, tetrabutylammonium chloride, (2-chloroethyl)trimethylammonium chloride, 2-hydroxy-N,N,N-trimethylethanaminium bromide, ethylammonium bromide, acetylcholine bromide, tetramethylammonium bromide, diethyl(2-hydroxyethyl)methylammonium bromide, 2-diethylamino ethanol hydrogen bromide, tetraethylammonium bromide, tetrabutylammonium bromide, (2-chloroethyl)trimethylammonium bromide, or any mixture thereof.

In some embodiments, the urea-based compound can be or can include urea and the bifunctional quaternary ammonium salt can be or can include 2-hydroxy-N,N,N-trimethylethanaminium chloride. In other embodiments, the urea-based compound can be or can include urea and at least one of methylurea, 1,3-dimethyl urea, 1,1-dimethyl urea, 1,1,3-trimethylurea, 1,1,3,3-tetramethylurea, methylolurea, dimethylolurea, trimethylolurea, and tetramethylolurea and the bifunctional quaternary ammonium salt can be or can include 2-hydroxy-N,N,N-trimethylethanaminium chloride and at least one of ethylammonium chloride, acetylcholine chloride, tetramethylammonium chloride, diethyl(2-hydroxyethyl)methylammonium chloride, 2-diethylamino ethanol hydrogen chloride, tetraethylammonium chloride, tetrabutylammonium chloride, (2-chloroethyl)trimethylammonium chloride, 2-hydroxy-N,N,N-trimethylethanaminium bromide, ethylammonium bromide, acetylcholine bromide, tetramethylammonium bromide, diethyl(2-hydroxyethyl)methylammonium bromide, 2-diethylamino ethanol hydrogen bromide, tetraethylammonium bromide, tetrabutylammonium bromide, and (2-chloroethyl)trimethylammonium bromide.

In some embodiments, the urea-based compound and/or the bifunctional quaternary ammonium salt can be a pure compound that is composed of essentially 100 wt % of solids. In other embodiments, the urea-based compound and/or the bifunctional quaternary ammonium salt can be in the form of a mixture that includes one or more liquid mediums, e.g., water. For example, a common aqueous solution of 2-hydroxy-N,N,N-trimethylethanaminium chloride includes about 25 wt % of water. In some embodiments, if an aqueous solution of the bifunctional quaternary ammonium salt and/or the urea-based compound is used, at least a portion of the water can be removed, e.g., via distillation.

In some embodiments, an aldehyde scavenger can be made by mixing, blending, or otherwise combining the urea-based compound and the bifunctional quaternary ammonium salt to produce the aldehyde scavenger. In some embodiments, the urea-based compound and the bifunctional quaternary ammonium salt can be combined at room temperature to produce the aldehyde scavenger. In other embodiments, the urea-based compound and the bifunctional quaternary ammonium salt can be combined and heated to a temperature of about 30° C., about 45° C., or about 60° C. to about 70° C., about 85° C., or about 100° C. to produce the aldehyde scavenger. In some embodiments, the urea-based compound and the bifunctional quaternary ammonium salt can be mixed for a time period of about 10 min, about 30, or about 45 min to about 60 min, about 120 min, or about 180 min to produce the aldehyde scavenger. In some embodiments, the mixture of the urea-based compound and the bifunctional quaternary ammonium salt can be subjected to vacuum distillation when mixed and heated. The vacuum distillation can be used to remove at least a portion of any water that may be present, e.g., water introduced as a component of the bifunctional quaternary ammonium salt and/or the urea-based compound. In other embodiments, the mixture of the urea-based compound and the bifunctional quaternary ammonium salt can be combined under an inert atmosphere, e.g., nitrogen and/or argon, to reduce or prevent water from absorbing into the aldehyde scavenger when the urea-based compound and the bifunctional quaternary ammonium salt are combined to produce the aldehyde scavenger.

In some embodiments, the urea-based compound and the bifunctional quaternary ammonium salt can be directly combined with the aldehyde-based resin to produce the binder composition. In such embodiment, the aldehyde scavenger and the binder composition can be produced at the same time as one another. The urea-based compound, the bifunctional quaternary ammonium salt, and the aldehyde-based resin can be mixed, blended, or otherwise combined with one another simultaneously or in any order or sequence to produce the binder composition. In one embodiment, the urea-based compound can be added to the aldehyde-based resin followed by the bifunctional quaternary ammonium salt or vice versa.

In some embodiments, all or at least a portion of the urea-based compound can be introduced as a component of the aldehyde-based resin. For example, an aldehyde-based resin such as a phenol-urea-formaldehyde resin can include a first portion of the urea used to make the resin that can be reacted into the resin and a second portion of the urea used to make the resin can be in the form of free urea, monomethylolurea, dimethylolurea, trimethylolurea, or any mixture thereof. In another example, an aldehyde-based resin such as a phenol-formaldehyde resin can be made via a process that can include back adding urea during the synthesis thereof such that the urea is initially "free" urea in the phenol-formaldehyde resin. In some embodiments, over time, at least a portion of the free urea can react with at least a portion of any residual free formaldehyde to produce methylolureas, such as monomethylolurea, dimethylolurea, trimethylolurea, or a mixture thereof.

In some embodiments, when the aldehyde scavenger is prepared before combining with the aldehyde-based resin, the aldehyde scavenger can include about 35 wt %, about 37 wt %, about 40 wt %, about 43 wt %, or about 45 wt % to about 47 wt %, about 50 wt %, about 53 wt %, or about 55 wt % of the urea-based compound, based on a combined weight of the urea-based compound and the bifunctional quaternary ammonium salt. In some embodiments, the aldehyde scavenger can include about 45 wt %, about 47 wt %, about 50 wt %, about 53 wt % or about 55 wt % to about 57 wt %, about 60 wt %, about 63 wt %, or about 65 wt % of the quaternary ammonium salt, based on the combined weight of the urea-based compound and the bifunctional quaternary ammonium salt.

In some embodiments, when the aldehyde scavenger is prepared before combining with the aldehyde-based resin, the aldehyde scavenger can have a molar ratio of the urea-based compound to the bifunctional quaternary ammonium salt of about 1.2:1, about 1.3:1, about 1.4:1, about 1.5:1, about 1.6:1, about 1.7:1, about 1.8:1, or about 1.9:1 to about 2.1:1, about 2.2:1, about 2.3:1, about 2.4:1, about 2.5:1, about 2.6:1, about 2.7:1, or about 2.8:1. In some embodiments, the aldehyde scavenger can have a molar ratio of the urea-based compound to the bifunctional quaternary ammonium salt of about 1.2:1 to about 2.8:1, about 1.5:1 to about 2.5:1, about 1.8:1 to about 2.2:1, or about 1.9:1 to about 2.1:1. In other embodiments, the aldehyde scavenger can have a molar ratio of the urea-based compound to the bifunctional quaternary ammonium salt of about 1.2:1 to about 2:1, about 2:1 to about 2.8:1, about 1.6:1 to about 2.2:1, about 1.8:1 to about 2:1, about 1.9:1 to about 2.2:1, or about 2:1 to about 2.4:1.

In some embodiments, the components of the aldehyde scavenger can be or can include the one or more urea-based compounds and the one or more bifunctional quaternary ammonium salts. In other embodiments, as mentioned above, the aldehyde scavenger can also include one or more liquid mediums. The liquid medium can be or can include, but is not limited to, water, one or more alcohols, one or more ethers, or any mixture thereof. Illustrative alcohols can include, but are not limited to, methanol, ethanol, propanol, isopropanol, n-butanol, sec-butanol, isobutanol, tert-butanol, ethylene glycol, glycerol, or any mixture thereof. Illustrative ethers can include, but are not limited to, dimethyl ether, diethyl ether, tetrahydrofuran, or any mixture thereof. In at least one embodiment, the liquid medium can be or can include water.

In some embodiments, when the aldehyde scavenger is prepared before combining with the aldehyde-based resin, if the aldehyde scavenger includes the liquid medium, the aldehyde scavenger can include the liquid medium in an amount of up to about 40 wt %, based on a combined weight of the urea-based compound, the quaternary ammonium salt, and the liquid medium. In other embodiments, the aldehyde scavenger can include about 0.5 wt %, about 1 wt %, about 1.5 wt %, about 2 wt %, or about 3 wt % to about 5 wt %, about 7 wt %, about 10 wt %, about 15 wt %, about 20 wt %, about 25 wt %, about 30 wt %, about 35 wt %, or about 40 wt % of the liquid medium, based on the combined weight of the urea-based compound, the quaternary ammonium salt, and the liquid medium.

In some embodiments, when the aldehyde scavenger is prepared before combining with the aldehyde-based resin, the aldehyde scavenger can have a non-volatile or solids content of about 60 wt %, about 70 wt %, about 80 wt %, about 90 wt %, or about 93 wt % to about 95 wt %, about 96 wt %, about 97 wt %, about 98 wt %, about 99 wt %, or about 100 wt %, based on a total weight of the aldehyde scavenger. In some embodiments, the aldehyde scavenger can have a non-volatile or solids content of at least 60 wt %, at least 63 wt %, at least 65 wt %, at least 67 wt %, at least 70 wt %, at least 73 wt %, at least 75 wt %, at least 77 wt %, at least 80 wt %, at least 83 wt %, at least 85 wt %, at least 87 wt %, at least 90 wt %, at least 93 wt %, at least 95 wt %, at least 97 wt %, or 100 wt %, based on a total weight of the aldehyde scavenger. As used herein, the non-volatile or solids content of a solution or solid/liquid mixture, e.g., the aldehyde scavenger, as understood by those skilled in the art, can be measured by determining the weight loss upon heating a small sample, e.g., about 1 g of the mixture, to a suitable temperature, e.g., about 125° C., and a time sufficient, e.g., about 1 hour and 45 minutes, to remove the liquid medium combined therewith in triplicate and then then three results can be averaged together. By measuring the weight of the sample before and after heating, the percent solids in the sample can be directly calculated or otherwise estimated.

In some embodiments, when the aldehyde scavenger is prepared before combining with the aldehyde-based resin, the viscosity of the aldehyde scavenger can be about 10 cP, about 100 cP, about 250 cP, about 350 cP, about 500 cP, or about 700 cP to about 1,000 cP, about 1,250 cP, about 1,500 cP, about 2,000 cP, or about 2,200 cP at a temperature of about 25° C. In another embodiment, the aldehyde scavenger can have a viscosity of about 100 cP to about 1,000 cP, about 10 cP to about 25 cP, about 100 cP to about 200 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In at least one embodiment, the aldehyde scavenger can have a viscosity of about 10 cP, about 100 cP, about 250 cP, about 350 cP, about 500 cP, or about 700 cP to about 1,000 cP, about 1,250 cP, about 1,500 cP, about 2,000 cP, or about 2,200 cP at a temperature of about 25° C. when the aldehyde scavenger has a solids content of about 93 wt % to about 100 wt %. The viscosity of the aldehyde scavenger and/or any other compound or composition disclosed herein can be determined using a viscometer at a temperature of about 25° C. For example, a Brookfield Viscometer, Model DV-II+, with a small sample adapter with, for example, a number 31 spindle, can be used. The small sample adapter can allow the sample to be cooled or heated by the chamber jacket to maintain the temperature of the sample surrounding the spindle at a temperature of about 25° C.

In some embodiments, when the aldehyde scavenger is prepared before combining with the aldehyde-based resin, the aldehyde scavenger can be stored on site for future use or transported to another location and stored. In some embodiments, the aldehyde scavenger can have a storage stability or shelf life at room temperature, e.g., about 25° C., of about 1 day or more, about 2 days or more, about 3 days or more, about 4 days or more, about 5 days or more, about 6 days or more, about 1 week or more, about 2 weeks or more, about 3 weeks or more, or about 4 weeks or more. In other embodiments, the aldehyde scavenger can have a storage stability or shelf life at below room temperature, e.g., about 20° C., of about 1 day or more, about 2 days or more, about 3 days or more, about 4 days or more, about 5 days or more, about 6 days or more, about 1 week or more, about 2 weeks or more, about 3 weeks or more, or about 4 weeks or more. In other embodiments, the aldehyde scavenger can have a storage stability or shelf life at below room temperature, e.g., about 15° C., of about 1 day or more, about 2 days or more, about 3 days or more, about 4 days or more, about 5 days or more, about 6 days or more, about 1 week or more, about 2 weeks or more, about 3 weeks or more, or about 4 weeks or more. As used herein, the terms "storage stability" and "shelf life" are used interchangeably and refer to the time required for one to visually detect the precipitation of matter on the bottom of a storage vessel containing the aldehyde scavenger or the binder composition that includes the aldehyde scavenger starting from when the aldehyde scavenger is made.

It has also been discovered that when the aldehyde scavenger is prepared before combining with the aldehyde-based resin, the addition of a liquid medium, e.g., water, in an amount of about 2 wt %, about 3 wt %, or about 5 wt % to about 7 wt %, about 8 wt %, or about 10 wt %, based on the combined weight of the urea-based compound, the bifunctional quaternary ammonium salt, and the liquid medium, can improve the low temperature stability of the aldehyde scavenger. In some embodiments, the aldehyde scavenger that includes the urea-based compound, the bifunctional quaternary ammonium salt, and the liquid medium, e.g., about 3 wt % to about 7 wt % of the liquid medium, can have a storage stability or shelf life at a temperature of about 11° C. of about 1 day or more, about 2 days or more, about 3 days or more, about 4 days or more, about 5 days or more, about 6 days or more, about 1 week or more, about 2 weeks or more, about 3 weeks or more, or about 4 weeks or more. In other embodiments, the aldehyde scavenger that includes the urea-based compound, the bifunctional quaternary ammonium salt, and the liquid medium, e.g., about 3 wt % to about 7 wt % of the liquid medium, can have a storage stability or shelf life at a temperature of about 5° C. of about 1 day or more, about 2 days or more, about 3 days or more, about 4 days or more, about 5 days or more, about 6 days or more, about 1 week or more, about 2 weeks or more, about 3 weeks or more, or about 4 weeks or more. In other embodiments, the aldehyde scavenger that includes the urea-based compound, the bifunctional quaternary ammonium salt, and the liquid medium, e.g., about 3 wt % to about 7 wt % of the liquid medium, can have a storage stability or shelf life at a temperature of about 3° C. of about 1 day or more, about 2 days or more, about 3 days or more, about 4 days or more, about 5 days or more, about 6 days or more, about 1 week or more, about 2 weeks or more, about 3 weeks or more, or about 4 weeks or more.

In some embodiments, when the aldehyde scavenger is prepared before combining with the aldehyde-based resin, the aldehyde scavenger can have a solids content of at least 90 wt % and be storage stable at a temperature of about 25° C. for at least 1 day or more, about 2 days or more, about 3 days or more, about 4 days or more, about 5 days or more, about 6 days or more, about 1 week or more, about 2 weeks or more, about 3 weeks or more, or about 4 weeks or more. In another embodiment, the aldehyde scavenger can have a solids content of at least 93 wt % and be storage stable at a temperature of about 25° C. for at least 1 day or more, about 2 days or more, about 3 days or more, about 4 days or more, about 5 days or more, about 6 days or more, about 1 week or more, about 2 weeks or more, about 3 weeks or more, or about 4 weeks or more. In another embodiment, the aldehyde scavenger can have a solids content of at least 95 wt % and be storage stable at a temperature of about 25° C. for at least 1 day or more, about 2 days or more, about 3 days or more, about 4 days or more, about 5 days or more, about 6 days or more, about 1 week or more, about 2 weeks or more, about 3 weeks or more, or about 4 weeks or more. In another embodiment, the aldehyde scavenger can have a solids content of at least 97 wt % and be storage stable at a temperature of about 25° C. for at least 1 day or more, about 2 days or more, about 3 days or more, about 4 days or more, about 5 days or more, about 6 days or more, about 1 week or more, about 2 weeks or more, about 3 weeks or more, or about 4 weeks or more.

Aldehyde-Based Resins

The aldehyde scavenger and/or the urea-based compound and the bifunctional quaternary ammonium compound (in any order or sequence) can be mixed, blended, or otherwise combined with one or more aldehyde-based resins to produce the binder composition. The binder composition can be used to make one or more composite products. Examples of suitable aldehyde-based resins can be or can include, but are not limited to, one or more urea-formaldehyde resins, one or more melamine-formaldehyde resins, one or more melamine-urea-formaldehyde resins, one or more melamine-urea-phenol-formaldehyde resins, one or more phenol-formaldehyde resins, one or more phenol-urea-formaldehyde resins, one or more resorcinol-formaldehyde resins, one or more resorcinol-phenol-formaldehyde resins, one or more resorcinol-urea-formaldehyde resins, one or more resorcinol-urea-phenol-formaldehyde resins, one or more aldehyde-based oligomers having (1) one or more polyalcohol-monoether groups covalently bonded thereto, (2) one or more polyalcohol-polyether groups covalently bonded thereto, or (3) one or more polyalcohol-monoether groups and one or more polyalcohol-polyether groups covalently bonded thereto, or any mixture thereof.

If the aldehyde-based resin includes the urea-formaldehyde resin, the urea-formaldehyde resin can have a formaldehyde to urea (F:U) molar ratio of about 0.60:1, about 0.80:1, about 1.0:1, about 1.05:1, about 1.1:1, about 1.15:1, about 1.2:1, about 1.3:1, about 1.4:1, or about 1.5:1 to about 2:1, about 3:1, about 4:1, or about 5:1. In some embodiments, the urea-formaldehyde resin can have a formaldehyde to urea molar ratio of about 1.1:1 to about 3.5:1, about 1.2:1 to about 3:1, about 1.15:1 to about 2.5:1, or about 1.1:1 to about 1.3:1.

If the aldehyde-based resin includes the melamine-formaldehyde resin, the melamine-formaldehyde resin can have a formaldehyde to melamine (F:M) molar ratio of about 1:1, about 2:1, or about 3:1 to about 4:1, about 5:1, or about 6:1. In some embodiments, the melamine-formaldehyde resin can have a formaldehyde to melamine molar ratio of about 1:1 to about 2.5:1, about 2:1 to about 4.5:1, about 3:1 to about 5:1, or about 3.5:1 to about 5.5:1.

If the aldehyde-based resin includes the melamine-urea-formaldehyde resin, the melamine-urea-formaldehyde resin can have a formaldehyde to total melamine and urea (F:(M+U)) molar ratio of about 0.60:1, about 0.80:1, about 1.0:1, about 1.05:1, about 1.1:1, about 1.15:1, about 1.2:1, about 1.3:1, about 1.4:1, or about 1.5:1 to about 2:1, about 3:1, about 4:1, or about 5:1. For example, the melamine-urea-formaldehyde resin can have a formaldehyde to total melamine and urea molar ratio of about 0.7:1, about 0.8:1, or about 0.9:1 to about 1.1:1, about 1.15:1, or about 1.2:1.

If the aldehyde-based resin includes the phenol-formaldehyde resin, the phenol-formaldehyde resin can have a formaldehyde to phenol (F:P) molar ratio of about 1:1, about 1.5:1, or about 1.7:1 to about 2:1, about 2.5:1, or about 3:1. For example, the phenol-formaldehyde resin can have a formaldehyde to phenol molar ratio of about 1.5:1, about 1.8:1, or about 2:1 to about 2.2:1, about 2.4:1, or about 2.6:1.

If the aldehyde-based resin includes the resorcinol-formaldehyde resin, the resorcinol-formaldehyde resin can have a formaldehyde to resorcinol (F:R) molar ratio of a about 1:1, about 1.5:1, or about 1.7:1 to about 2:1, about 2.5:1, or about 3:1. For example, the resorcinol-formaldehyde resin can have a formaldehyde to resorcinol molar ratio of about 1.5:1, about 1.8:1, or about 2:1 to about 2.2:1, about 2.4:1, or about 2.6:1.

If the aldehyde-based resin includes the phenol-resorcinol-formaldehyde resin, the phenol-resorcinol-formaldehyde resin can have a formaldehyde to total phenol and resorcinol (F:(P+R)) molar ratio of about 1:1, about 1.5:1, or about 1.7:1 to about 2:1, about 2.5:1, or about 3:1. For example, the phenol-resorcinol-formaldehyde resin can have a formaldehyde to total phenol and resorcinol molar ratio of about 1.5:1, about 1.8:1, or about 2:1 to about 2.2:1, about 2.4:1, or about 2.6:1.

Many aldehyde-based resins that can be used are commercially available. One particularly useful class of aldehyde-based resins can include those discussed and described in U.S. Pat. No. 5,362,842. Urea-formaldehyde resins such as the types sold by Georgia Pacific Chemicals LLC, e.g., GP® 2928 and GP® 2980, can also be used.

Aldehyde-Based Oligomer

In some embodiments, the aldehyde-based resin that include the aldehyde-based oligomer can be a preferred aldehyde-based resin for making fiberglass products. The aldehyde-based oligomer having a polyalcohol-monoether group covalently bonded thereto can have a chemical formula (I) of:

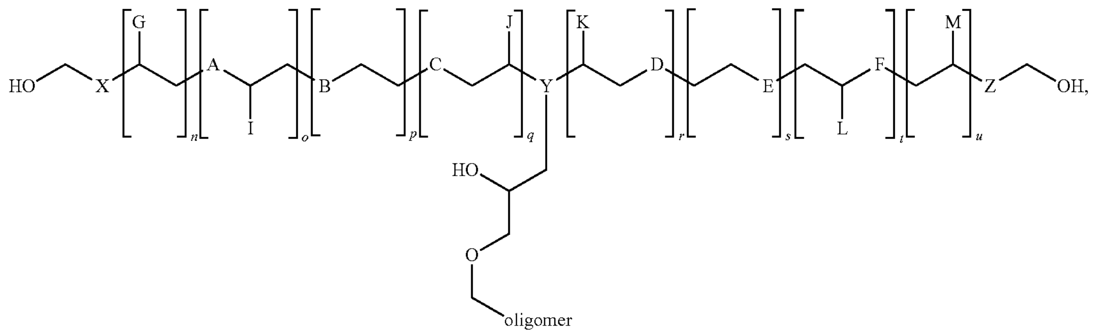

(I)

where A and F can independently be $CH_2$, O, or NH; B, C, D, and E can independently be $CH_2$ or O; G. I, J, K, L, and M can independently be $CH_3$ or H; X and Z can independently be OH, $NH_2$, or NH; Y can be O, NH, or N; n, o, p, q, r, s, t, and u can independently be an integer of 0 to 6, at least one of n, u and t can be an integer of 1 to 6; and the oligomer can be a urea-formaldehyde oligomer, a melamine-formaldehyde oligomer, a melamine-urea-formaldehyde oligomer, a melamine-urea-phenol-formaldehyde oligomer, a phenol-formaldehyde oligomer, a phenol-urea-formaldehyde oligomer, a resorcinol-formaldehyde oligomer, a resorcinol-phenol-formaldehyde oligomer, a resorcinol-urea-formaldehyde oligomer, a resorcinol-urea-phenol-formaldehyde oligomer, a biuret-aldehyde oligomer; an adipamide-aldehyde oligomer; a 2-cyano-guanidine-aldehyde oligomer; a thiourea-aldehyde oligomer; a cyanurate-aldehyde oligomer; a bis-phenol alcohol-aldehyde oligomer; a 4-tert-butylphenol-aldehyde oligomer; or a 2,4-di-tert-butylphenol-aldehyde oligomer.

In some embodiments, in chemical formula (I), X and Z can be NH; n and u can be 1; G and M can be H; o, p, q, r s, and t can be 0; and the oligomer can be the phenol-aldehyde oligomer; the urea-aldehyde oligomer; the melamine-aldehyde oligomer; the phenol-urea-aldehyde oligomer; the melamine-urea-aldehyde oligomer; the biuret-aldehyde oligomer; the adipamide-aldehyde oligomer; the 2-cyano-guanidine-aldehyde oligomer; the thiourea-aldehyde oligomer; the cyanurate-aldehyde oligomer; the bis-phenol alcohol-aldehyde oligomer; the 4-tert-butylphenol-aldehyde oligomer; or the 2,4-di-tert-butylphenol-aldehyde oligomer. In one embodiment, in chemical formula (I), X and Z can be NH; n and u can be 1; G and M can be H; o, p, q, r s, and t can be 0; and the oligomer can be the urea-formaldehyde oligomer. In another embodiment, in chemical formula (I), X and Z can be NH; n and u can be 1; G and M can be H; o, p, q, r s, and t can be 0, and the oligomer can be the phenol-formaldehyde oligomer. In another embodiment, in chemical formula (I), X and Z can be NH; n and u can be 1; G and M can be H; o, p, q, r s, and t can be 0, and the oligomer can be the melamine-formaldehyde oligomer.

In some embodiments, in chemical formula (I), X and Z can be NH; o, p, s, t, and u can be 1; n, q, and r can be 0; A, B, E, and F can be $CH_2$; I, L and M can be H; Y can be N; and the oligomer can be the urea-formaldehyde oligomer. In some embodiments, X and Z can be NH; o, p, s, t, and u can be 1; n, q, and r can be 0; A, B, E, and F can be $CH_2$; I, L and M can be H; Y can be N; and the oligomer can be the phenol-formaldehyde oligomer. In some embodiments, X and Z can be NH; o, p, s, t, and u can be 1; n, q, and r can be 0; A, B, E, and F can be $CH_2$; I, L and M can be H; Y can be N; and the oligomer can be the melamine-formaldehyde oligomer.

In some embodiments, in chemical formula (I), X, Z, and A can be NH; n, o, and u can be 1; p, q, r, s, and t can be 0; G, I, and M can be H; Y can be N; and the oligomer can be the phenol-aldehyde oligomer; the urea-aldehyde oligomer; the melamine-aldehyde oligomer; the phenol-urea-aldehyde oligomer; the melamine-urea-aldehyde oligomer; the biuret-aldehyde oligomer; the adipamide-aldehyde oligomer; the 2-cyano-guanidine-aldehyde oligomer; the thiourea-aldehyde oligomer; the cyanurate-aldehyde oligomer; the bis-phenol alcohol-aldehyde oligomer; the 4-tert-butylphenol-aldehyde oligomer; or the 2,4-di-tert-butylphenol-aldehyde oligomer. In one embodiment, in chemical formula (I), X, Z, and A can be NH; n, o, and u can be 1; p, q, r, s, and t can be 0; G, I, and M can be H; Y can be N; and the oligomer can be the urea-formaldehyde oligomer. In another embodiment, in chemical formula (I), X, Z, and A can be NH; n, o, and u can be 1; p, q, r, s, and t can be 0; G, I, and M can be H; Y can be N; and the oligomer can be the phenol-formaldehyde oligomer. In another embodiment, in chemical formula (I), X, Z, and A can be NH; n, o, and u can be 1; p, q, r, s, and t can be 0; G, I, and M can be H; Y can be N; and the oligomer can be the melamine-formaldehyde oligomer.

In some embodiments, in chemical formula (I), X and Z can be O, n and u can be 1; o, p, q, r, s, and t can be 0; G and M can be H; Y can be N; and the oligomer can be the phenol-aldehyde oligomer; the urea-aldehyde oligomer; the melamine-aldehyde oligomer; the phenol-urea-aldehyde oligomer; the melamine-urea-aldehyde oligomer; the biuret-aldehyde oligomer; the adipamide-aldehyde oligomer; the 2-cyano-guanidine-aldehyde oligomer; the thiourea-aldehyde oligomer; the cyanurate-aldehyde oligomer; the bis-phenol alcohol-aldehyde oligomer; the 4-tert-butylphenol-aldehyde oligomer; or the 2,4-di-tert-butylphenol-aldehyde oligomer. In one embodiment, in chemical formula (I), X and Z can be O, n and u can be 1; o, p, q, r, s, and t can be 0; G and M can be H; Y can be N; and the oligomer can be the urea-formaldehyde oligomer. In another embodiment, in chemical formula (I), X and Z can be O, n and u can be 1; o, p, q, r, s, and t can be 0; G and M can be H; Y can be N;

and the oligomer can be the phenol-formaldehyde oligomer. In another embodiment, in chemical formula (I), X and Z can be O, n and u can be 1; o, p, q, r, s, and t can be 0; G and M can be H; Y can be N; and the oligomer can be the melamine-formaldehyde oligomer.

In some embodiments, in chemical formula (I), X and Z can be NH; n, o, t, and u can be 1; p, q, r, and s can be 0; A and F can be NH; G, I, L, and M can be H; Y can be N; and the oligomer can be the phenol-aldehyde oligomer; the urea-aldehyde oligomer; the melamine-aldehyde oligomer; the phenol-urea-aldehyde oligomer; the melamine-urea-aldehyde oligomer; the biuret-aldehyde oligomer; the adipamide-aldehyde oligomer; the 2-cyano-guanidine-aldehyde oligomer; the thiourea-aldehyde oligomer; the cyanurate-aldehyde oligomer; the bis-phenol alcohol-aldehyde oligomer; the 4-tert-butylphenol-aldehyde oligomer; or the 2,4-di-tert-butylphenol-aldehyde oligomer. In one embodiment, in chemical formula (I), X and Z can be NH; n, o, t, and u can be 1; p, q, r, and s can be 0; A and F can be NH; G, I, L, and M can be H; Y can be N; and the oligomer can be the urea-formaldehyde oligomer. In another embodiment, in chemical formula (I), X and Z can be NH; n, o, t, and u can be 1; p, q, r, and s can be 0; A and F can be NH; G, I, L, and M can be H; Y can be N; and the oligomer can be the phenol-formaldehyde oligomer. In another embodiment, in chemical formula (I), X and Z can be NH; n, o, t, and u can be 1; p, q, r, and s can be 0; A and F can be NH; G, I, L, and M can be H; Y can be N; and the oligomer can be the melamine-formaldehyde oligomer.

The oligomer having a polyalcohol-polyether group covalently bonded thereto can have a chemical formula (II) of:

rate-aldehyde oligomer; a bis-phenol alcohol-aldehyde oligomer; a 4-tert-butylphenol-aldehyde oligomer; or a 2,4-di-tert-butylphenol-aldehyde oligomer.

In some embodiments, in chemical formula (II), X and Z can be NH; n and u can be 1; o, p, q, r, s, and t can be 0; G and M can be H; Y can be N; and the oligomer can be the urea-aldehyde oligomer; the melamine-aldehyde oligomer; the phenol-urea-aldehyde oligomer; the melamine-urea-aldehyde oligomer; the biuret-aldehyde oligomer; the adipamide-aldehyde oligomer; the 2-cyano-guanidine-aldehyde oligomer; the thiourea-aldehyde oligomer; the cyanurate-aldehyde oligomer; the bis-phenol alcohol-aldehyde oligomer; the 4-tert-butylphenol-aldehyde oligomer; or the 2,4-di-tert-butylphenol-aldehyde oligomer. In one embodiment, in chemical formula (II), X and Z can be NH; n and u can be 1; o, p, q, r, s, and t can be 0; G and M can be H; Y can be N; and the oligomer can be the urea-formaldehyde oligomer. In another embodiment, in chemical formula (II), X and Z can be NH; n and u can be 1; o, p, q, r, s, and t can be 0; G and M can be H; Y can be N; and the oligomer can be the phenol-formaldehyde oligomer. In another embodiment, in chemical formula (II), X and Z can be NH; n and u can be 1; o, p, q, r, s, and t can be 0; G and M can be H; Y can be N; and the oligomer can be the melamine-formaldehyde oligomer.

In some embodiments, in chemical formula (II), A, B, E, and F can be $CH_2$; I, L, and M can be H; X and Z can be NH; Y can be N, o, p, s, and t can be 1; n, q, r, and u can be 0; and the oligomer can be the urea-aldehyde oligomer; the melamine-aldehyde oligomer; the phenol-urea-aldehyde oligomer; the melamine-urea-aldehyde oligomer; the biuret- (II)

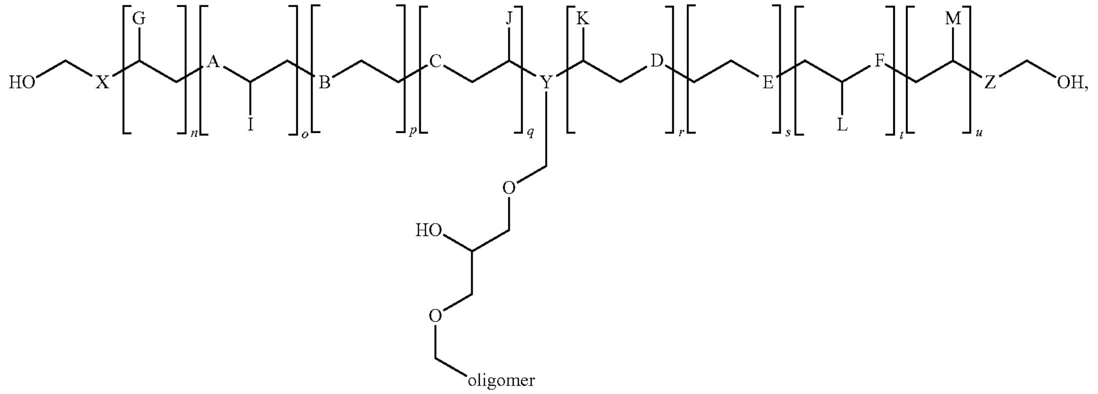

In chemical formula (II), A and F can independently be $CH_2$, O, or NH; B, C, D, and E can independently be $CH_2$ or O; G, I, J, K, L, and M can independently be $CH_3$ or H; X and Z can independently be OH, $NH_2$, or NH; Y can be O or NH; n, o, p, q, r, s, t, and u can be independently an integer of 0 to 6, at least one of n, u, and t can be an integer of 1 to 6; and the oligomer can be a urea-formaldehyde oligomer, a melamine-formaldehyde oligomer, a melamine-urea-formaldehyde oligomer, a melamine-urea-phenol-formaldehyde oligomer, a phenol-formaldehyde oligomer, a phenol-urea-formaldehyde oligomer, a resorcinol-formaldehyde oligomer, a resorcinol-phenol-formaldehyde oligomer, a resorcinol-urea-formaldehyde oligomer, a resorcinol-urea-phenol-formaldehyde oligomer, a biuret-aldehyde oligomer; an adipamide-aldehyde oligomer; a 2-cyano-guanidine-aldehyde oligomer; a thiourea-aldehyde oligomer; a cyanualdehyde oligomer; the adipamide-aldehyde oligomer; the 2-cyano-guanidine-aldehyde oligomer; the thiourea-aldehyde oligomer; the cyanurate-aldehyde oligomer; the bis-phenol alcohol-aldehyde oligomer; the 4-tert-butylphenol-aldehyde oligomer; or the 2,4-di-tert-butylphenol-aldehyde oligomer. In one embodiment, in chemical formula (II), A, B, E, and F can be $CH_2$; I, L, and M can be H; X and Z can be NH; Y can be N, o, p, s, and t can be 1; n, q, r, and u can be 0; and the oligomer can be the urea-aldehyde oligomer. In another embodiment, in chemical formula (II), A, B, E, and F can be $CH_2$; I, L, and M can be H; X and Z can be NH; Y can be N, o, p, s, and t can be 1; n, q, r, and u can be 0; and the oligomer can be the phenol-aldehyde oligomer. In another embodiment, in chemical formula (II), A, B, E, and F can be $CH_2$; I, L, and M can be H; X and Z can be NH; Y can be N, o, p, s, and t can be 1; n, q, r, and u can be 0; and the oligomer can be the melamine-aldehyde oligomer.

In some embodiments, in chemical formula (II), X and Z can be NH; n, o and u can be 1; p, q, r, s, and t can be 0; A can be NH; G, I, and M can be H; Y can be N; and the oligomer can be the urea-aldehyde oligomer; the melamine-aldehyde oligomer; the phenol-urea-aldehyde oligomer; the melamine-urea-aldehyde oligomer; the biuret-aldehyde oligomer; the adipamide-aldehyde oligomer; the 2-cyano-guanidine-aldehyde oligomer; the thiourea-aldehyde oligomer; the cyanurate-aldehyde oligomer; the bis-phenol alcohol-aldehyde oligomer; the 4-tert-butylphenol-aldehyde oligomer; or the 2,4-di-tert-butylphenol-aldehyde oligomer. In one embodiment, in chemical formula (II), X and Z can be NH; n, o and u can be 1; p, q, r, s, and t can be 0; A can be NH; G, I, and M can be H; Y can be N; and the oligomer can be the urea-formaldehyde oligomer. In another embodiment, in chemical formula (II), X and Z can be NH; n, o and u can be 1; p, q, r, s, and t can be 0; A can be NH; G, I, and M can be H; Y can be N; and the oligomer can be the phenol-formaldehyde oligomer. In another embodiment, in chemical formula (II), X and Z can be NH; n, o and u can be 1; p, q, r, s, and t can be 0; A can be NH; G, I, and M can be H; Y can be N; and the oligomer can be the melamine-formaldehyde oligomer.

In some embodiments, in chemical formula (II), X and Z can be O; n and u can be 1; o, p, q, r, s, and t can be 0; G and M can be H; Y can be N; and the oligomer can be the urea-aldehyde oligomer; the melamine-aldehyde oligomer; the phenol-urea-aldehyde oligomer; the melamine-urea-aldehyde oligomer; the biuret-aldehyde oligomer; the adipamide-aldehyde oligomer; the 2-cyano-guanidine-aldehyde oligomer; the thiourea-aldehyde oligomer; the cyanurate-aldehyde oligomer; the bis-phenol alcohol-aldehyde oligomer; the 4-tert-butylphenol-aldehyde oligomer; or the 2,4-di-tert-butylphenol-aldehyde oligomer. In one embodiment, in chemical formula (II), X and Z can be O; n and u can be 1; o, p, q, r, s, and t can be 0; G and M can be H; Y can be N; and the oligomer can be the urea-formaldehyde oligomer. In another embodiment, in chemical formula (II), X and Z can be O; n and u can be 1; o, p, q, r, s, and t can be 0; G and M can be H; Y can be N; and the oligomer can be the phenol-formaldehyde oligomer. In another embodiment, in chemical formula (II), X and Z can be O; n and u can be 1; o, p, q, r, s, and t can be 0; G and M can be H; Y can be N; and the oligomer can be the melamine-formaldehyde oligomer.

In some embodiments, in chemical formula (II), X and Z can be NH; n, o, t, and u can be 1; p, q, r, and s can be 0; A and F can be NH; G, I, L, and M can be H; Y can be N; and the oligomer can be the urea-aldehyde oligomer; the melamine-aldehyde oligomer; the phenol-urea-aldehyde oligomer; the melamine-urea-aldehyde oligomer; the biuret-aldehyde oligomer; the adipamide-aldehyde oligomer; the 2-cyano-guanidine-aldehyde oligomer; the thiourea-aldehyde oligomer; the cyanurate-aldehyde oligomer; the bis-phenol alcohol-aldehyde oligomer; the 4-tert-butylphenol-aldehyde oligomer; or the 2,4-di-tert-butylphenol-aldehyde oligomer. In another embodiment, in chemical formula (II), X and Z can be NH; n, o, t, and u can be 1; p, q, r, and s can be 0; A and F can be NH; G, I, L, and M can be H; Y can be N; and the oligomer can be the urea-formaldehyde oligomer. In another embodiment, in chemical formula (II), X and Z can be NH; n, o, t, and u can be 1; p, q, r, and s can be 0; A and F can be NH; G, I, L, and M can be H; Y can be N; and the oligomer can be the phenol-formaldehyde oligomer. In another embodiment, in chemical formula (II), X and Z can be NH; n, o, t, and u can be 1; p, q, r, and s can be 0; A and F can be NH; G, I, L, and M can be H; Y can be N; and the oligomer can be the melamine-formaldehyde oligomer.

In some embodiments the oligomer having chemical formula (I) and/or the oligomer having chemical formula (II) can have a weight average molecular weight of about 200, about 225, or about 250 to about 350, about 400, about 500, about 600, about 700, about 800, about 900, or about 1,000. In other embodiments, the oligomer having chemical formula (I) and/or the oligomer having chemical formula (II) can have a weight average molecular weight of less than 1000, less than 900, less than 800, less than 700, less than 600, less than 500, or less than 450. It should be noted that the weight average molecular weight of the oligomer having chemical formula I and/or the oligomer having chemical formula II does not take into account any contribution from the polyalcohol-monoether group or the polyalcohol-polyether group covalently bonded thereto, respectively.

In some embodiments, the binder composition can be or can include a first oligomer having the polyalcohol-monoether group covalently bonded thereto and having chemical formula (I), a second oligomer having the polyalcohol-polyether group covalently bonded thereto and having chemical formula (II), or a mixture thereof, where the first oligomer and the second oligomer, if both present, can be the same or different with respect to one another. In some embodiments, the first oligomer and the second oligomer, if present, can be different from one another by having different weight average molecular weights, different chemical structures, of a combination thereof.

In other embodiments, the binder composition can be or include a first oligomer having a first polyalcohol-monoether group covalently bonded thereto and having chemical formula (I), a second oligomer having a second polyalcohol-monoether group covalently bonded thereto and having chemical formula (I), where at least one of the first oligomer and the second oligomer or at least one of the first polyalcohol-monoether and the second polyalcohol-monoether are different with respect to one another. In other embodiments, the binder composition can be or include a first oligomer having a first polyalcohol-polyether group covalently bonded thereto and having chemical formula (II), a second oligomer having a second polyalcohol-polyether group covalently bonded thereto and having the chemical formula (II), where at least one of the first oligomer and the second oligomer or at least one of the first polyalcohol-polyether and the second polyalcohol-polyether are different with respect to one another. It should be noted that the binder composition can include any number of oligomers each having one or more polyalcohol-monoethers covalently bonded thereto and having chemical formula (I), any number of oligomers each having one more polyalcohol-polyethers covalently bonded thereto and having chemical formula 1, and/or any number of oligomers having one or more polyalcohol-monoethers and one or more polyalcohol-polyethers (chemical formula not shown) covalently bonded thereto.

In some embodiments, the oligomer in chemical formula (I) and/or chemical formula (II) can be or include a reaction product of one or more aldehyde compounds and one or more amide compounds. In some embodiments, the oligomer in chemical formula (I) and/or chemical formula (II) can be or include a reaction product of one or more aldehyde compounds and one or more phenolic compounds. In other embodiments, the oligomer in chemical formula (I) and/or chemical formula (II) can be or include a reaction product of one or more aldehyde compounds, one or more amide compounds, and one or more phenolic compounds.

Illustrative aldehyde compounds can be or can include, but are not limited to, formaldehyde, acetaldehyde, propanal (propionaldehyde), butanal (butyraldehyde), furan-2-carbaldehyde (furfuraldehyde), benzaldehyde, (2E)-3-phenylprop-2-enal (cinnamaldehyde), oxaldehyde (glyoxal), propanedial (malondialdehyde), butanedial (succindialdehyde), pentanedial (glutaraldehyde), benzene-1,2-dicarbaldehyde (phthalaldehyde), or any mixture thereof. In some embodiments, the aldehyde compound can be or include formaldehyde. Formaldehyde, as the other components, can be available in many forms. For example, formaldehyde can be supplied as an aqueous solution, such as formalin. In some embodiments, the formalin can contain about 37 wt % to about 50 wt % of formaldehyde. Other forms of formaldehyde such as paraformaldehyde and/or urea-formaldehyde concentrate 85 (UFC 85) can also be used in lieu of or in addition to aqueous formaldehyde solutions.

Illustrative amide compounds can be or can include, but are not limited to, urea, 1,3,5-triazine-2,4,6-triamine (melamine), 2-Imidodicarbonic diamide (biuret), adipamide, 2-cyanoguanidine, thiourea, 1,3,5-Triazinane-2,4,6-trione (cyanurate), or any mixture thereof. In some embodiments, the amide compound can be or include urea, melamine, or a mixture thereof. In at least one embodiment, the amide compound can be or include urea. Illustrative phenolic compounds can be or include, but are not limited to, phenol, benzene-1,3-diol (resorcinol), benzene-1,2-diol (catechol), benzene-1,4-diol (hydroquinone), or any mixture thereof. In at least one embodiment, the phenolic compound can be or include phenol, benzene-1,3-diol, or a mixture thereof. In at least one other embodiment, the phenolic compound can be or include phenol.

In some embodiments, the oligomer in chemical formula (I) and/or chemical formula (II) can be or can include the reaction product of one or more aldehyde compounds, one or more amide compounds, and one or more phenolic compounds. In some embodiments, the aldehyde compound can be or can include formaldehyde, the amid compound can be or include urea, melamine, or a mixture thereof, and the phenolic compound can be or can include phenol, benzene-1,3-diol, or a mixture thereof. In at least one embodiment, the aldehyde compound can be or can include formaldehyde, the amide compound can be or can include urea, and the phenolic compound can be or can include phenol.

The oligomer having the polyalcohol-monoether group covalently bonded thereto and having chemical formula (I) and/or the oligomer having the polyalcohol-polyether group covalently bonded thereto and having chemical formula (II) can be synthesized, made, or otherwise produced by reacting one or more aldehydes, one or more polyamine compounds, one or more polyol compounds, and/or one or more polyamine/polyol compounds, one or more epihalohydrin compounds, and one or more amide compounds and/or one or more phenolic compounds. For example, the oligomer can be produced by reacting the aldehyde compound and the amide compound and/or the phenolic compound. The polyalcohol-monoether and/or the polyalcohol-polyether can be produced by reacting the aldehyde compound, the polyamine compound, the polyol compound, and/or the polyamine/polyol compound, and the epihalohydrin compound. The oligomer having the polyalcohol-monoether group covalently bonded thereto and having chemical formula (I) and/or the oligomer having the polyalcohol-polyether group covalently bonded thereto and having chemical formula (II) can be produced by reacting the oligomer and the polyalcohol-monoether and/or the polyalcohol-polyether.

Illustrative polyamine compounds can be or include, but are not limited to, diethylenetriamine (DETA), bis(hexamethylene)triamine, hexamethylenediamine, tetramethylenetetramine, tris(2-aminoethyle)amine, ethylene diamine, polyether amines, or any mixture thereof. Illustrative polyol compounds can be or include but are not limited to, diethylene glycol, polyvinyl alcohol, polyethylene glycol, pentaerythritol, sorbitol, triglycerol, or any mixture thereof. In some embodiments, rather than using what can be referred to as a polyamine compound or a polyol compound, a compound that can be considered as being both a polyamine compound and a polyol ("polyamine/polyol") compound ("polyamine/polyol compound") can be used. Illustrative polyamine/polyol compounds can be or include, but are not limited to, diethanolamine, triethanolamine, N-(2-hydroxyethyl)ethylenediamine, 2-(2-aminoethoxy)ethanol, or any mixture thereof. Illustrative epihalohydrin compounds can be or include, but are not limited to, epichlorohydrin, epibromohydrin, epiiodohydrin, or any mixture thereof.

In some embodiments, the aldehyde compound and the polyamine compound and/or polyol compound can be introduced into a reaction vessel to produce a first reaction mixture or first mixture. In one embodiment, the aldehyde compound can be introduced to the reaction vessel followed by the polyamine compound and/or polyol compound. In another embodiment, the polyamine compound and/or the polyol compound can be introduced to the reaction vessel followed by the aldehyde compound. In another embodiment, the aldehyde compound and the polyamine compound and/or the polyol compound can be introduced into the reaction vessel at the same time or substantially the same time. The aldehyde compound and the polyamine compound and/or polyol compound can be allowed to exotherm and react within the reaction vessel to produce a first intermediate. The oligomer having the polyalcohol-monoether group covalently bonded thereto and having chemical formula (I) and/or the oligomer having the polyalcohol-polyether group covalently bonded thereto and having chemical formula (II) can be produced according to the processes disclosed in WO Publication No. WO 2019/213092.

In some embodiments, when the aldehyde-based resin can include the urea-based compound, e.g., a urea-formaldehyde resin, a phenol-urea-formaldehyde resin, an aldehyde-based oligomer that can include the urea-based compound, or the like, the bifunctional quaternary ammonium salt alone can be added to the aldehyde-based resin that includes the urea-based compound. As such, in some embodiments, the bifunctional quaternary ammonium salt alone, rather than a mixture of the urea-based compound and the bifunctional quaternary ammonium salt can be added to aldehyde-based resin that includes the urea-based compound. Indeed, it is well-known and understood that aldehyde-based resins that include urea can include one or more urea-based compounds, e.g., free urea, methylolurea, dimethylolurea, and/or trimethylolurea. For example, a urea-formaldehyde resin or a phenol-urea-formaldehyde resin can, in addition to the polymer solids, also include free urea and/or other urea-based compounds such as methylolurea, dimethylolurea, trimethylolurea. or a mixture thereof. As such, upon the addition of the bifunctional quaternary ammonium salt alone to the aldehyde-based resin that includes a urea-based compound, the aldehyde scavenger can be produced or otherwise formed.

The aldehyde-based resin can include one or more liquid mediums. In some embodiments, the liquid medium can be or can include, but is not limited to, water, one or more alcohols, one or more ethers, one or more other organic solvents, or any mixture thereof. In at least one embodiment, the liquid medium can be water. Illustrative alcohols can include, but are not limited to, methanol, ethanol, propanol, isopropanol, n-butanol, sec-butanol, isobutanol, tert-butanol, ethylene glycol, or any mixture thereof. Illustrative ethers can include, but are not limited to, dimethyl ether, diethyl ether, tetrahydrofuran, or any mixture thereof.

Binder Composition

The binder composition that includes the urea-based compound, the bifunctional quaternary ammonium salt, and the aldehyde-based resin can have a molar ratio of total aldehyde-based compound(s) to total urea-based compound(s) of about 0.5:1, about 0.7:1, about 0.9:1, about 1:1, about 1.2:1, about 1.4:1, or about 1.6:1 to about 1.9:1, about 2:1, about 2.1:1, about 2.2:1, about 2.3:1, about 2.4:1, about 2.5:1, about 2.6:1, about 2.7:1, or about 2.8:1, based on the combined weight the urea-based compound, the bifunctional quaternary ammonium salt, and the aldehyde-based resin. The total aldehyde-based compound(s) in the molar ratio of the total aldehyde-based compound(s) to the total urea-based compound(s) includes all the aldehyde-based compound(s) in the aldehyde-based resin, including any free aldehyde-based compound(s) that did not react during synthesis of the aldehyde-based resin. The total urea-based compound(s) in the molar ratio of the total aldehyde-based compound(s) to the total urea-based compound(s) includes all the urea-based compound(s) in the urea-based compound any urea-based compound(s) in the aldehyde-based resin, including any free urea-based compound(s) that did not react during synthesis of the aldehyde-based resin. For purposes of the molar ratio of the total aldehyde-based compound(s) to the total urea-based compound(s), when the aldehyde-based resin includes a melamine-formaldehyde resin or a melamine-urea-formaldehyde resin, the melamine in the aldehyde-based resin and any free melamine present in the aldehyde-based resin is treated as being part of the urea (the molecular weight of melamine is used) for purposes of calculating the molar ratio of the total aldehyde-based compound(s) to the total urea-based compound(s).

In some embodiments, when the binder composition includes the urea-based compound, the bifunctional quaternary ammonium salt, and a urea-formaldehyde resin, the binder composition can have a molar ratio of total aldehyde-based compound(s) to total urea-based compound(s) of about 0.5:1, about 0.7:1, or about 0.9:1 to about 1:1, about 1.2:1, or about 1.3:1, based on the combined weight of the urea-based compound, the bifunctional quaternary ammonium salt, and the urea-formaldehyde resin. In some embodiments, when the binder composition includes the urea-based compound, the bifunctional quaternary ammonium salt, and a melamine-formaldehyde resin, the binder composition can have a molar ratio of total aldehyde-based compound(s) to total urea-based compound(s) of about 0.5:1, about 0.8:1, or about 1:1 to about 1.1:1, about 1.2:1, or about 1.3:1, based on the combined weight of the urea-based compound, the bifunctional quaternary ammonium salt, and the melamine-formaldehyde resin. In some embodiments, when the binder composition includes the urea-based compound, the bifunctional quaternary ammonium salt, and a melamine-urea-formaldehyde resin, the binder composition can have a molar ratio of total aldehyde-based compound(s) to total urea-based compound(s) of about 0.5:1, about 0.8:1, or about 1:1 to about 1.1:1, about 1.2:1, or about 1.3:1, based on the combined weight of the urea-based compound, the bifunctional quaternary ammonium salt, and the melamine-urea-formaldehyde resin. In some embodiments, when the binder composition includes the urea-based compound, the bifunctional quaternary ammonium salt, and a phenol-formaldehyde, a resorcinol-formaldehyde, and/or a phenol-resorcinol-formaldehyde resin, the binder composition can have a molar ratio of total aldehyde-based compound(s) to total urea-based compound(s) of about 1:1, about 1.3:1, or about 1.6:1 to about 2:1, about 2.4:1, or about 2.8:1, based on the combined weight of the urea-based compound, the bifunctional quaternary ammonium salt, and the phenol-formaldehyde, the resorcinol-formaldehyde, and/or the phenol-resorcinol-formaldehyde resin.

In some embodiments, the binder composition can include about 0.1 wt %, about 0.5 wt %, about 1 wt %, about 3 wt %, about 5 wt %, about 10 wt %, about 20 wt %, about 30 wt %, about 40 wt %, or about 45 wt % to about 55 wt %, about 65 wt %, about 70 wt %, about 75 wt %, about 80 wt %, or about 85 wt % of a combined amount of the urea-based compound and the bifunctional quaternary ammonium salt, based on the combined solids weight of the urea-based compound, the bifunctional quaternary ammonium salt, and the aldehyde-based resin. In some embodiments, the binder composition can include about 15 wt %, about 20 wt %, about 25 wt %, about 30 wt %, about 35 wt %, about 40 wt %, about 45 wt %, about 50 wt %, about 55 wt %, or about 60 wt % to about 70 wt %, about 80 wt %, about 90 wt %, about 95 wt %, about 97 wt %, about 99 wt %, about 99.5 wt %, or about 99.9 wt % of the aldehyde-based resin, based on the combined solids weight of the urea-based compound, the bifunctional quaternary ammonium salt, and the aldehyde-based resin.

In some embodiments, the binder composition can include about 0.5 wt %, about 1 wt %, about 5 wt %, about 10 wt %, or about 15 wt % to about 20 wt %, about 25 wt %, about 30 wt %, about 35 wt %, about 40 wt %, about 45 wt %, or about 50 wt % of the urea-based compound, based on the combined solids weight of the urea-based compound, the bifunctional quaternary ammonium salt, and the aldehyde-based resin. In some embodiments, the binder composition can include about 0.5 wt %, about 1 wt %, about 5 wt %, about 10 wt %, about 20 wt %, or about 30 wt % to about 40 wt %, about 50 wt %, about 55 wt %, about 60 wt %, about 65 wt % or about 70 wt % of the bifunctional quaternary ammonium salt, based on the combined solids weight of the urea-based compound, the bifunctional quaternary ammonium salt, and the aldehyde-based resin. In some embodiments, the binder composition an include about 30 wt %, about 35 wt %, about 40 wt %, about 45 wt %, about 50 wt %, about 55 wt % or about 60 wt % to about 70 wt %, about 75 wt %, about 80 wt %, about 85 wt %, about 90 wt %, or about 95 wt % of the aldehyde-based resin, based on the combined solids weight of the urea-based compound, the bifunctional quaternary ammonium salt, and the aldehyde-based resin.

In some embodiments, the binder composition can include about 0.5 wt %, about 1 wt %, about 5 wt %, about 10 wt %, or about 15 wt % to about 20 wt %, about 25 wt %, about 30 wt %, about 35 wt %, about 40 wt %, about 45 wt %, or about 50 wt % of the urea-based compound, based on the total solids weight of the binder composition. In some embodiments, the binder composition can include about 0.5 wt %, about 1 wt %, about 5 wt %, about 10 wt %, about 20 wt %, or about 30 wt % to about 40 wt %, about 50 wt %, about 55 wt %, about 60 wt %, about 65 wt % or about 70 wt % of the bifunctional quaternary ammonium salt, based on the total solids weight of the binder composition. In some embodiments, the binder composition an include about 30 wt %, about 35 wt %, about 40 wt %, about 45 wt %, about 50 wt %, about 55 wt % or about 60 wt % to about 70 wt %, about 75 wt %, about 80 wt %, about 85 wt %, about 90 wt %, or about 95 wt % of the aldehyde-based resin, based on the total solids weight of the binder composition.

In some embodiments, the binder composition can include the urea-formaldehyde resin, the melamine-formaldehyde resin, the melamine-urea-formaldehyde resin, and/or a mixture thereof and can include about 0.5 wt % to about 85 wt % of a combined amount of the urea-based compound and the bifunctional quaternary ammonium salt and about 15 wt % to about 99.5 wt % of the urea-formaldehyde resin, the melamine-formaldehyde resin, and/or the a melamine-urea-formaldehyde resin, based on the combined solids weight of the urea-based compound, the bifunctional quaternary ammonium salt, and the urea-formaldehyde resin, the melamine-formaldehyde resin, and/or the melamine-urea-formaldehyde resin. In some embodiments, the binder composition can include the phenol-formaldehyde resin, the resorcinol formaldehyde resin, the phenol-resorcinol-formaldehyde resin or any mixture thereof and can include about 0.5 wt % to about 85 wt % of a combined amount of the urea-based compound and the bifunctional quaternary ammonium salt and about 15 wt % to about 99.5 wt % of the phenol-formaldehyde resin, the resorcinol-formaldehyde resin, and/or the phenol-resorcinol-formaldehyde resin, based on the combined solids weight of the urea-based compound, the bifunctional quaternary ammonium salt, and the phenol-formaldehyde resin, the resorcinol-formaldehyde resin, and/or the phenol-resorcinol-formaldehyde resin.

In some embodiments, the binder composition that includes the urea-based compound, the bifunctional quaternary ammonium salt, and the aldehyde-based resin can have a non-volatile or solids content of at least 36 wt %, at least 38 wt %, at least 40 wt %, at least 47 wt %, at least 50 wt %, at least 53 wt %, or at least 55 wt % to about 60 wt %, about 62 wt %, about 64 wt %, about 66 wt %, about 68 wt %, about 70 wt %, about 72 wt %, or about 74 wt %, based on the combined weight of the urea-based resin, the bifunctional quaternary ammonium salt, and the aldehyde based resin. In other embodiments, the binder composition that includes the urea-based compound, the bifunctional quaternary ammonium salt, and the aldehyde-based resin can have a non-volatile or solids content of at least 36 wt %, at least 38 wt %, at least 40 wt %, at least 47 wt %, at least 50 wt %, at least 53 wt %, or at least 55 wt % to about 60 wt %, about 62 wt %, about 64 wt %, about 66 wt %, about 68 wt %, about 70 wt %, about 72 wt %, or about 74 wt %, based on the total weight of the binder composition. For example, the binder composition can have a solids content of about 60 wt % to about 70 wt %, about 50 wt % to about 65 wt %, about 58 wt % to about 66 wt %, about 61 wt % to about 69 wt %, about 62 wt % to about 75 wt %, about 63 wt % to about 70 wt %, or about 64 wt % to about 75 wt %, based on the total weight of the binder composition. In other embodiments, the binder composition that includes the urea-based compound, the bifunctional quaternary ammonium salt, and the aldehyde-based resin can have a non-volatile or solids content of about 5 wt %, about 7 wt %, about 10 wt %, about 12 wt % to about 17 wt %, about 20 wt %, about 23 wt %, about 25 wt %, about 27 wt %, or about 30 wt %, based on the total weight of the binder composition. For example, in the manufacture of non-woven fiberglass mats, a solids content of about 5 wt % to about 30 wt %, or about 10 wt % to about 20 wt % based on the total weight of the binder can be a preferred solids content. Whereas, in the manufacture of composite lignocellulosic products, binder compositions having a greater solids content can be preferred over binder compositions having a lower solids content.

The binder composition can be stored on site for future use or transported to another location and stored. In some embodiments, the binder composition can have a storage stability or shelf life at room temperature, e.g., about 25° C., of about 1 day or more, about 2 days or more, about 3 days or more, about 4 days or more, about 5 days or more, about 6 days or more, about 1 week or more, about 2 weeks or more, about 3 weeks or more, or about 4 weeks or more. In other embodiments, the binder composition can have a storage stability or shelf life at below room temperature, e.g., about 20° C., of about 1 day or more, about 2 days or more, about 3 days or more, about 4 days or more, about 5 days or more, about 6 days or more, about 1 week or more, about 2 weeks or more, about 3 weeks or more, or about 4 weeks or more. In other embodiments, the binder composition can have a storage stability or shelf life at below room temperature, e.g., about 15° C., of about 1 day or more, about 2 days or more, about 3 days or more, about 4 days or more, about 5 days or more, about 6 days or more, about 1 week or more, about 2 weeks or more, about 3 weeks or more, or about 4 weeks or more.

In some embodiments, the binder composition can include about 4 wt % to about 25 wt % of a combined amount of the urea-based compound and the bifunctional quaternary ammonium salt and about 75 wt % to about 96 wt % of the aldehyde-based resin and can have a storage stability or shelf life at room temperature, e.g., about 25° C., of about 1 day or more, about 2 days or more, about 3 days or more, about 4 days or more, about 5 days or more, about 6 days or more, about 1 week or more, about 2 weeks or more, about 3 weeks or more, or about 4 weeks or more. In other embodiment, the binder composition can include about 26 wt % to about 45 wt % of a combined amount of the urea-based compound and the bifunctional quaternary ammonium salt and about 55 wt % to about 74 wt % of the aldehyde-based resin, based on the combined solids weigh of the urea-based compound, the bifunctional quaternary ammonium salt, and the aldehyde-based binder, and can have a solids content of about 60 wt % to about 90 wt %, based on the weight of the binder composition, and can have a storage stability or shelf life at room temperature, e.g., about 25° C., of about 1 day or more, about 2 days or more, about 3 days or more, about 4 days or more, about 5 days or more, about 6 days or more, about 1 week or more, about 2 weeks or more, about 3 weeks or more, or about 4 weeks or more.

The binder composition that includes the urea-based compound, the bifunctional quaternary ammonium salt, and the aldehyde-based resin can contain less than 3 wt %, less than 2 wt %, less than 1.5 wt %, less than 1 wt %, less than 0.7 wt %, less than 0.5 wt %, less than 0.4 wt %, less than 0.3 wt %, less than 0.2 wt %, less than 0.1 wt %, less than 0.09 wt %, less than 0.08 wt %, less than 0.07 wt %, less than 0.06 wt %, or less than 0.05 wt % of free formaldehyde. As such, the aldehyde-based resin as well as products made therefrom can exhibit reduced formaldehyde emission while still maintaining a reduced cure time or acceptable rate of cure and/or products having sufficient strength. The amount of free formaldehyde can be measured according ASTM D1979-97.

The binder composition that includes the urea-based compound, the bifunctional quaternary ammonium salt, and the aldehyde-based resin can also include one or more additives. Illustrative additives can be or can include, but are not limited to, waxes and/or other hydrophobic additives, water, filler material(s), extenders, surfactants, release agents, dyes, fire retardants, aldehyde scavengers, biocides, latexes, one or more adducts or polymers of styrene, at least one of maleic anhydride and maleic acid, and at least one of an acrylic acid and an acrylate, copolymers of one or more vinyl aromatic compounds and one or more unsaturated carboxylic acids, one or more unsaturated carboxylic anhydrides, or a combination of one or more unsaturated carboxylic acids and one or more unsaturated carboxylic anhydrides, or any combination or mixture thereof. In some embodiments, the latexes, adducts or polymers and/or the copolymers can be preferred for use in making non-woven fiberglass mats.

For composite wood products, such as plywood, typical filler material(s) can include, but are not limited to, ground pecan and/or walnut shells, and typical extenders can include, for example, wheat flour, corn flour, soy flour, or any mixture thereof. Suitable extenders can also include, but are not limited to, polysaccharides, sulfonated lignins, or a mixture thereof. Illustrative polysaccharides can include, but are not limited to, starch, cellulose, gums, such as guar and xanthan, alginates, pectin, gellan, or any mixture thereof. Suitable polysaccharide starches can include, for example maize or corn, waxy maize, high amylose maize, potato, tapioca, and wheat starch. Other starches such as genetically engineered starches can include, but are not limited to, high amylose potato and potato amylopectin starches. Illustrative sulfonated lignins can include, but are not limited to, sodium lignosulfonate, ammonium lignosulfonate, calcium lignosulfonate, or any mixture thereof.

The aldehyde-based resin can also include, but is not limited to, additives such as ammonia, alkanolamines, and/or polyamines, such as an alkyl primary diamine, e.g., ethylenediamine ("EDA"). Other additives, such as ethylene ureas, and primary, secondary and tertiary amines, for example, dicyanodiamide, can also be incorporated into urea-formaldehyde resins. Concentrations of these additives in the reaction mixture can vary from about 0.05 wt % to about 20 wt %, based on the solids content of the aldehyde-based resin.

In some embodiments, the binder composition can have a viscosity of about 10 cP, about 25 cP, about 50 cP, about 100 cP, about 300 cP, about 450 cP, about 550 cP, or about 700 cP to about 900 cP, about 1,000 cP, about 1,200 cP, about 1,300 cP, or about 1,400 cP at a temperature of about 25° C. In some embodiments, the binder composition can have a viscosity of about 100 cP, about 400 cP, about 580 cP, about 650 cP, about 750 cP, or about 800 cP to about 900 cP, about 950 cP, about 980 cP, about 990 cP, or about 1,000 cP at a temperature of about 25° C. when the binder composition has a solids content of about 35 wt % to about 90 wt %.

In some embodiments, the binder composition can include one or more latexes. Illustrative latexes can include, but are not limited to, styrene/acrylic acid ester copolymer, styrene-butadiene rubber, acrylonitrile butadiene styrene, acrylic polymers, polyvinyl acetate, or any combination thereof. The latexes can be prepared using any suitable process. For example, the styrene/acrylic acid ester copolymer ("SAE") can be the reaction product of a hydrophobic styrene-based monomer and acrylic acid ester co-polymerized in an emulsion. A suitable SAE copolymer can be prepared as discussed and described in U.S. Pat. No. 6,734,232. Other suitable latexes can include, but are not limited to, those described in U.S. Pat. Nos.: 4,258,098; 4,560,612; 4,917,764; 9,109,311.

In some embodiments, the binder composition can include about 1 wt %, about 2 wt %, about 3 wt %, about 4 wt %, or about 5 wt % to about 8 wt %, about 10 wt %, about 12 wt %, about 15 wt %, about 17 wt %, or about 20 wt % of the latex, based on a total solids weight of the binder composition. In some embodiments, the binder composition can include about 1 wt %, about 3 wt %, about 5 wt % or about 7 wt % to about 10 wt %, about 12 wt %, about 15 wt %, about 18 wt %, or about 20 wt % of a combined amount of the urea-based compound and the bifunctional quaternary ammonium salt, about 1 wt %, about 2 wt %, about 3 wt %, about 4 wt %, or about 5 wt % to about 8 wt %, about 10 wt %, about 12 wt %, about 15 wt %, about 17 wt %, or about 20 wt % of the latex, and about 70 wt %, about 75 wt %, about or about 80 wt % to about 90 wt %, about 95 wt %, about 97 wt %, or about 99 wt % of the aldehyde-based resin, based on the total solids weight of the binder composition. In some embodiments, the binder composition can include about 0.5 wt %, about 1 wt %, about 5 wt %, about 10 wt %, or about 15 wt % to about 30 wt %, about 35 wt %, about 40 wt %, about 45 wt %, or about 50 wt % of the urea-based compound, about 0.5 wt %, about 1 wt %, about 5 wt %, about 10 wt %, about 20 wt %, or about 30 wt % to about 40 wt %, about 50 wt %, about 60 wt %, or about 70 wt % of the bifunctional quaternary ammonium salt, about 1 wt %, about 2 wt %, about 3 wt %, about 4 wt %, or about 5 wt % to about 8 wt %, about 10 wt %, about 12 wt %, about 15 wt %, about 17 wt %, or about 20 wt % of the latex, and about 70 wt %, about 75 wt %, about or about 80 wt % to about 90 wt %, about 95 wt %, about 97 wt %, or about 99 wt % of the aldehyde-based resin, based on the total solids weight of the binder composition.

In some embodiments, the binder composition can include one or more copolymers of one or more vinyl aromatic compounds and one or more unsaturated carboxylic acids, one or more unsaturated carboxylic anhydrides, or a combination of one or more unsaturated carboxylic acids and one or more unsaturated carboxylic anhydrides. Illustrative vinyl aromatic compounds can include, but are not limited to, styrene, alpha-methylstyrene, vinyl toluene, and combinations thereof. Preferably, the vinyl aromatic derived units are derived from styrene and/or derivatives thereof. More preferably, the vinyl aromatic compound can be derived from styrene and the copolymer can be a styrene maleic anhydride (acid) or "SMA" copolymer. Suitable SMA copolymers include resins that contain alternating styrenic and maleic anhydride (acid) monomer units, arranged in random, alternating, and/or block forms. For example, suitable SMA copolymers can have the following generalized formula in the unneutralized form:

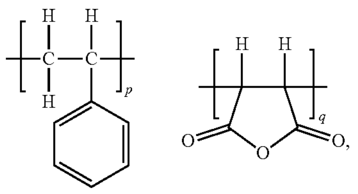

where p and q are positive numbers in a ratio (p:q) that can vary from about 0.5:1.0 to about 5:1.

Unneutralized SMA copolymers can be insoluble in water. Sufficient neutralization of the SMA copolymers in an aqueous environment can solubilize the SMA copolymers. For example, the SMA copolymers can be neutralized in an aqueous environment using an alkaline substance to produce solubilized SMA copolymers. Illustrative alkaline substances can include, but are not limited to, hydroxides such as sodium hydroxide, potassium hydroxide, ammonium hydroxide (e.g., aqueous ammonia), lithium hydroxide, and/or cesium hydroxide; carbonates such as sodium carbonate, potassium carbonate, and/or ammonium carbonate; ammonia and/or an amine (e.g., an alkanolamine) Although it generally is desirable to use the neutralizing agent in an amount sufficient to neutralize 100 mole % ("mol %") of the SMA copolymer, an amount sufficient to obtain water solubility can be used. The level of addition of any particular neutralizing agent to obtain an acceptable degree of water solubility is well within the normal skill in the art and the product of only routine experimentation. For example, about 50 mol %, 60 mol %, 70 mol %, 80 mol %, 90 mol %, or 95 mol % of the SMA copolymer can be neutralized. In one or more embodiments, the amount of neutralization can range from a low of about 40 mol %, about 45 mol %, or about 50 mol % to a high of about 65 mol %, about 75 mol %, or about 90 mol % of the SMA copolymer. As known to those skilled in the art, solubilizing the SMA copolymer can be facilitated at elevated temperature and/or pressure.

The SMA copolymer can include about 7 mol % to about 50 mol % maleic anhydride (maleic acid) and conversely about 50 mol % to about 93 mol % vinyl aromatic derived units. In another example, the copolymer can include from about 20 mol % to about 40 mol % maleic anhydride (maleic acid) and conversely of from about 60 mol % to about 80 mol % vinyl aromatic derived units. In another example, the maleic anhydride (maleic acid) can be present in an amount ranging from a low of about 7 mol %, about 10 mol %, about 12 mol %, or about 15 mol % to a high of about 30 mol %, about 35 mol %, about 40 mol %, or about 45 mol %, based on the total weight of the maleic anhydride (maleic acid) and the one or more vinyl derived units. In still another example, the vinyl aromatic derived units can be present in an amount ranging from a low of about 50 mol %, about 55 mol %, about 60 mol %, or about 65 mol % to a high of about 75 mol %, about 80 mol %, about 85 mol %, or about 90 mol %, based the total weight of the maleic anhydride (maleic acid) and the one or more vinyl derived units.

The SMA copolymer can contain a minor amount (less than 50 mol %, or less than about 40 mol %, or less than about 30 mol %, or less than about 20 mol %, based on the amount of maleic anhydride (maleic acid)) of another unsaturated carboxylic acid monomer such as aconitic acid, itaconic acid, acrylic acid, methacrylic acid, crotonic acid, isocrotonic acid, citraconic acid, and fumaric acid and the mixtures thereof. The SMA copolymer can also contain a minor amount (less than 50 mol %, or less than about 40 mol %, or less than about 30 mol %, or less than about 20 mol %, based on the amount of the vinyl aromatic derived units) of another hydrophobic vinyl monomer. Another "hydrophobic vinyl monomer" is a monomer that typically produces, as a homopolymer, a polymer that is water-insoluble or capable of absorbing less than 10% by weight water. Suitable hydrophobic vinyl monomers are exemplified by (i) vinyl esters of aliphatic acids such as vinyl acetate, vinyl propionate, vinyl butyrate, vinyl caproate, vinyl 2-ethylhexanoate, vinyl laurate, and vinyl stearate; (ii) diene monomers such as butadiene and isoprene; (iii) vinyl monomers and halogenated vinyl monomers such as ethylene, propylene, cyclohexene, vinyl chloride and vinylidene chloride; (iv) acrylates and alkyl acrylates, such as methyl acrylate, ethyl acrylate, n-propyl acrylate, isopropyl acrylate, n-butyl acrylate, isobutyl acrylate, tert-butyl acrylate, n-hexyl acrylate, cyclohexyl acrylate, and 2-ethylhexyl acrylate; and (v) nitrile monomers such as acrylonitrile and methacrylonitrile and mixtures thereof.

The molecular weight of the SMA copolymer can vary within wide limits. The SMA copolymer can have a weight average molecular weight ("Mw") of between about 1,000 and about 500,000. For example, the SMA copolymer can have a Mw ranging from a low of about 1,000, about 5,000, about 10,000, about 15,000, or about 20,000 to a high of about 100,000, about 200,000, about 300,000, about 400,000, or about 500,000. In another example, the Mw of the SMA copolymer can range from a low of about 1,000, about 5,000, or about 10,000 up to about 400,000, or about 350,000, or about 300,000, or about 250,000, or about 200,000, or about 175,000, or about 150,000, or about 120,000 or about 100,000, or about 90,000, or about 80,000, or about 70,000, or about 60,000, or about 50,000, or about 40,000, or about 30,000, or about 20,000.

In one or more embodiments, the SMA copolymers can be partially esterified. For example, the SMA copolymers can be partially esterified and can still contain some anhydride groups. The partial esters of the SMA copolymers can be prepared in conventional manners from alkanols of about 3 to 20 carbon atoms, preferably from hexanol or octanol. The extent of the partial-esterification of the SMA copolymers can range from about 5 to 95%, from about 10% to about 80%, from about 20% to about 50%, or from about 15% to about 40%. The esterification can be effected by simply heating a mixture of the appropriate quantities of the SMA copolymers with the alcohol at elevated temperatures, e.g., from about 100° C. to about 200° C. In one or more embodiments, the benzene ring of the SMA copolymers can be substituted with one or more groups. For example, the benzene ring of the SMA copolymers can contain one or more sulfonate groups.

In some embodiments, the binder composition can include about 0.1 wt %, about 0.5 wt %, about 1 wt %, about 2 wt %, or about 4 wt % to about 6 wt %, about 7 wt %, about 8 wt %, about 9 wt %, about 10 wt %, or about 12 wt % of the copolymer of one or more vinyl aromatic compounds and one or more unsaturated carboxylic acids, one or more unsaturated carboxylic anhydrides, or a combination of one or more unsaturated carboxylic acids and one or more unsaturated carboxylic anhydrides, based on a total solids weight of the binder composition. In some embodiments, the binder composition can include about 1 wt %, about 3 wt %, about 5 wt % or about 7 wt % to about 10 wt %, about 12 wt %, about 15 wt %, about 18 wt %, or about 20 wt % of a combined amount of the urea-based compound and the bifunctional quaternary ammonium salt, about 0.1 wt %, about 0.5 wt %, about 1 wt %, about 2 wt %, or about 3 wt % to about 6 wt %, about 7 wt %, about 8 wt %, about 9 wt %, about 10 wt %, or about 12 wt % of the copolymer of one or more vinyl aromatic compounds and one or more unsaturated carboxylic acids, one or more unsaturated carboxylic anhydrides, or a combination of one or more unsaturated carboxylic acids and one or more unsaturated carboxylic anhydrides, and about 70 wt %, about 75 wt %, about or about 80 wt % to about 90 wt %, about 95 wt %, about 97 wt %, or about 99 wt % of the aldehyde-based resin, based on the total solids weight of the binder composition. In some embodiments, the binder composition can include about 0.5 wt %, about 1 wt %, about 5 wt %, about 10 wt %, or about 15 wt % to about 30 wt %, about 35 wt %, about 40 wt %, about 45 wt %, or about 50 wt % of the urea-based compound, about 0.5 wt %, about 1 wt %, about 5 wt %, about 10 wt %, about 20 wt %, or about 30 wt % to about 40 wt %, about 50 wt %, about 60 wt %, or about 70 wt % of the bifunctional quaternary ammonium salt, about 0.1 wt %, about 0.5 wt %, about 1 wt %, about 2 wt %, or about 3 wt % to about 6 wt %, about 7 wt %, about 8 wt %, about 9 wt %, about 10 wt %, or about 12 wt % of the copolymer of one or more vinyl aromatic compounds and one or more unsaturated carboxylic acids, one or more unsaturated carboxylic anhydrides, or a combination of one or more unsaturated carboxylic acids and one or more unsaturated carboxylic anhydrides, and about 70 wt %, about 75 wt %, about or about 80 wt % to about 90 wt %, about 95 wt %, about 97 wt %, or about 99 wt % of the aldehyde-based resin, based on the total solids weight of the binder composition.

Suitable SMA copolymers are commercially available from numerous companies. For example, suitable SMA copolymers can be purchased from, among others, Polyscope Polymers BV, Sartomer USA, LLC, Hercules, Inc., and Georgia-Pacific Chemical LLC.

In some embodiments, the binder composition can include one or more adducts or polymers of styrene, at least one of maleic anhydride and maleic acid, and at least one of an acrylic acid and an acrylate. Any suitable acrylic acid or acrylate can be used such as methyl methacrylate, butyl acrylate, methacrylate, or any combination thereof. Preferably, the acrylate is methyl methacrylate ("MMA"). The adduct can be prepared by dissolving the components of the adduct in a suitable solution. Illustrative solutions can include, but are not limited to, aqueous solutions of sodium hydroxide, ammonium hydroxide, potassium hydroxide, and combinations thereof. The solution can be heated to a temperature of about 70° C. to about 90° C. The solution can be held at the elevated temperature until the components are all at least partially in solution.

In some embodiments, the adduct can be prepared by combining styrene, at least one of maleic anhydride and maleic acid, and at least one of an acrylic acid and an acrylate to form a terpolymer. The amount of styrene in the adduct can range from a low of about 50 wt %, about 55 wt %, or about 60 wt % to a high of about 75 wt %, about 80 wt %, or about 85 wt %, based on the total weight of the adduct. The amount of the maleic anhydride and/or maleic acid in the adduct can range from a low of about 15 wt %, about 20 wt %, or about 25 wt % to a high of about 40 wt %, about 45 wt %, or about 50 wt %, based on the total weigh of the adduct. The amount of the acrylic acid and/or the acrylate in the adduct can range from a low of about 1 wt %, about 3 wt % or about 5 wt % to a high of about 10 wt %, about 15 wt %, or about 20 wt %, based on the total weight of the adduct.

In another example, the acrylic acid or acrylate can be combined with the copolymer of one or more vinyl aromatic derived units and at least one of maleic anhydride and maleic acid to provide the modifier. For example, combining the acrylic acid or acrylate with SMA can form a styrene maleic anhydride methyl-methacrylate terpolymer. In another example, the modifier can also include a physical mixture of styrene acrylic acid and/or styrene-acrylate copolymer and a SMA copolymer. The adduct or polymer of styrene, at least one of maleic anhydride and maleic acid, and at least one of an acrylic acid and an acrylate and the physical mixture of styrene acrylic acid and/or styrene-acrylate copolymer and a SMA copolymer can be prepared according to the processes discussed and described in U.S. Pat. No. 6,642,299.

In some embodiments, the binder composition can include about 1 wt %, about 2 wt %, about 3 wt %, about 4 wt %, or about 5 wt % to about 8 wt %, about 10 wt %, about 12 wt %, about 15 wt %, about 17 wt %, or about 20 wt % of the adduct or polymer of styrene, at least one of maleic anhydride and maleic acid, and at least one of an acrylic acid and an acrylate, based on a total solids weight of the binder composition. In some embodiments, the binder composition can include about 1 wt %, about 3 wt %, about 5 wt % or about 7 wt % to about 10 wt %, about 12 wt %, about 15 wt %, about 18 wt %, or about 20 wt % of a combined amount of the urea-based compound and the bifunctional quaternary ammonium salt, about 1 wt %, about 2 wt %, about 3 wt %, about 4 wt %, or about 5 wt % to about 8 wt %, about 10 wt %, about 12 wt %, about 15 wt %, about 17 wt %, or about 20 wt % of the adduct or polymer of styrene, at least one of maleic anhydride and maleic acid, and at least one of an acrylic acid and an acrylate, and about 70 wt %, about 75 wt %, about or about 80 wt % to about 90 wt %, about 95 wt %, about 97 wt %, or about 99 wt % of the aldehyde-based resin, based on the total solids weight of the binder composition. In some embodiments, the binder composition can include about 0.5 wt %, about 1 wt %, about 5 wt %, about 10 wt %, or about 15 wt % to about 30 wt %, about 35 wt %, about 40 wt %, about 45 wt %, or about 50 wt % of the urea-based compound, about 0.5 wt %, about 1 wt %, about 5 wt %, about 10 wt %, about 20 wt %, or about 30 wt % to about 40 wt %, about 50 wt %, about 60 wt %, or about 70 wt % of the bifunctional quaternary ammonium salt, about 1 wt %, about 2 wt %, about 3 wt %, about 4 wt %, or about 5 wt % to about 8 wt %, about 10 wt %, about 12 wt %, about 15 wt %, about 17 wt %, or about 20 wt % of the adduct or polymer of styrene, at least one of maleic anhydride and maleic acid, and at least one of an acrylic acid and an acrylate, and about 70 wt %, about 75 wt %, about or about 80 wt % to about 90 wt %, about 95 wt %, about 97 wt %, or about 99 wt % of the aldehyde-based resin, based on the total solids weight of the binder composition.

Composite Products

As noted above, the composite product can be or can include, but is not limited to composite lignocellulosic products, fiberglass products, laminate products, and the like. The lignocellulosic substrates (material that includes both cellulose and lignin) can include, but is not limited to, straw, hemp, sisal, cotton stalk, wheat, bamboo, sabai grass, rice straw, banana leaves, paper mulberry (e.g., bast fiber), abaca leaves, pineapple leaves, esparto grass leaves, fibers from the genus Hesperaloe in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, animal fibers (e.g., wool, hair), recycled paper products (e.g., newspapers, cardboard, cereal boxes, and magazines), or any combination thereof. Suitable woods can include softwoods and/or hardwoods. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow.

The starting material, from which the lignocellulosic substrates can be derived from, can be reduced to the appropriate size or dimensions by various processes such as hogging, grinding, hammer milling, tearing, shredding, and/or flaking. Suitable forms of the lignocellulosic substrates can include, but are not limited to, chips, flakes, wafers, fibers, shavings, sawdust or dust, or the like. The lignocellulosic substrates can have a length ranging from a low of about 0.05 mm, about 0.1 mm, about 0.2 mm to a high of about 1 mm, about 5 mm, about 10 mm, about 20 mm, about 30 mm, about 40 mm, about 50 mm, or about 100 mm.

The starting material, from which the lignocellulosic substrates can be derived from, can also be formed into the appropriate size or dimension by skiving, cutting, slicing, sawing, or otherwise removing a thin layer or sheet from a source of lignocellulosic material, e.g., a wood log, to produce a veneer or layer. One or more composite products can be produced from two or more veneer. For example, composite products produced with veneer, in finished form, can include those products typically referred to as laminated veneer lumber ("LVL"), laminated veneer boards ("LVB"), and/or plywood. As such, suitable lignocellulosic substrates can include, but are not limited to, wood chips, wood fibers, wood flakes, wood strands, wood wafers, wood shavings, wood particles, wood veneer, or any combination thereof.

As used herein, the terms "fiber," "fibrous," "fiberglass," "fiber glass," "glass fibers," and the like are used interchangeably and refer to materials that have an elongated morphology exhibiting an aspect ratio (length to thickness) of greater than 100, generally greater than 500, and often greater than 1,000. Indeed, an aspect ratio of over 10,000 is possible. Suitable fibers can be glass fibers, natural fibers, synthetic fibers, mineral fibers, ceramic fibers, metal fibers, carbon fibers, or any combination thereof. Illustrative glass fibers can include, but are not limited to, A-type glass fibers, C-type glass fibers, E-type glass fibers, S-type glass fibers, ECR-type glass fibers, wool glass fibers, and any combination thereof. In at least one specific embodiment, the fibers can be glass fibers that are wet use chopped strand glass fibers ("WUCS"). Wet use chopped strand glass fibers can be formed by conventional processes known in the art. The WUCS can have a moisture content ranging from a low of about 5%, about 8%, or about 10% to a high of about 20%, about 25%, or about 30%.

The binder composition can be mixed, blended, or otherwise contacted with the substrates to produce a resinated substrate. The resinated substrate can include, on a solids basis, about 0.15 wt %, about 0.5 wt %, about 1 wt %, about 5 wt %, about 10 wt %, or about 20 wt % to about 30 wt %, about 40 wt %, about 50 wt %, about 55 wt %, or about 60 wt % of the aldehyde scavenger, based on a dry weight of the substrates. The resinated substrate can include, on a solids basis, about 1.5 wt %, about 3 wt %, about 5 wt %, about 10 wt %, about 15 wt %, or about 20 wt % to about 30 wt %, about 40 wt %, about 50 wt %, about 55 wt %, or about 60 wt % of the aldehyde-based resin, based on a dry weight of the substrates.

Process for Making Composite Lignocellulosic Products

A composite lignocellulosic product can be made by contacting one or more lignocellulosic substrates with the binder composition to produce a resinated furnish and at least partially curing the binder composition in the resinated furnish to produce a composite lignocellulosic product. Illustrative composite lignocellulosic products or articles that can be made using the binder composition can include, but are not limited to, plywood (e.g., hardwood plywood and/or softwood plywood), oriented strand board ("OSB"), engineered wood flooring, particleboard, fiberboard (e.g., medium density fiberboard ("MDF") and/or high density fiberboard ("HDF")), chipboard, flakeboard, or waferboard, structural composite lumber, glue-laminated lumber (Glulam) other wood and non-wood products. Structural composite lumber can include, but is not limited to, laminated veneer lumber (LVL), parallel strand lumber (PSL), laminated strand lumber (LSL), and oriented strand lumber (OSL).

The amount of the binder composition applied to the lignocellulosic substrates can be from a low of about 1 wt %, about 2 wt %, about 3 wt %, about 4 wt %, about 5 wt % or about 6 wt % to a high of about 10 wt %, about 12 wt %, about 15 wt %, or about 20 wt %, based on a dry weight of the lignocellulosic substrates. For example, the mixture or combination of the binder composition and the lignocellulosic substrates can include about 1 wt % to about 7 wt %, about 3 wt % to about 15 wt %, about 5 wt % to about 14 wt %, about 6 wt % to about 12 wt %, or about 7 wt % to about 10 wt % of the binder composition, based on the dry weight of the lignocellulosic substrates. The composite lignocellulosic product can include about 1 wt % to about 7 wt %, about 3 wt % to about 15 wt %, about 5 wt % to about 14 wt %, about 6 wt % to about 12 wt %, or about 7 wt % to about 10 wt % of the cured binder composition, based on the dry weight of the lignocellulosic substrates. For example, the composite lignocellulosic product can include about 1 wt % to about 4 wt %, about 1.5 wt % to about 5 wt %, about 2 wt % to about 4 wt %, about 2 wt % to about 6 wt %, about 4 wt % to about 10 wt %, about 6 wt % to about 9 wt %, or about 0.5 wt % to about 5.5 wt % of the cured binder composition, based on the dry weight of the lignocellulosic substrates.

The binder composition can be applied to a plurality of lignocellulosic substrates, which can be formed into a desired shape before or after application of the binder composition, and the aldehyde-based resin can be at least partially cured to produce a composite lignocellulosic product. In another embodiment, the binder composition can be applied to wood or other lignocellulosic based veneers and/or substrates and the binder composition can be at least partially cured to adhere or otherwise bond the veneer(s) and/or substrate(s) to one another. In another embodiment, the binder composition can be applied to a plurality of lignocellulosic fibers, particles, flakes, strands, and/or the like, formed into a mat or board, and at least partially cured to produce a composite lignocellulosic product in the form of a mat or board. The plurality of lignocellulosic substrates can be randomly oriented, oriented in a desired manner such as in the production of oriented strand board, or a combination of random and oriented substrates can be used in the manufacture of composite lignocellulosic products.

The lignocellulosic substrates can be contacted with the binder composition by spraying, coating, mixing, brushing, falling film or curtain coating, dipping, soaking, or the like. The lignocellulosic substrates contacted with the binder composition can be formed into a desired shape before, during, and/or after at least partial curing of the binder composition. Depending on the particular product, the lignocellulosic substrates contacted with the binder composition can be pressed before, during, and/or after the binder composition is at least partially cured. For example, the lignocellulosic substrates contacted with the binder composition can be consolidated or otherwise formed into a desired shape, if desired pressed to a particular density and thickness, and heated to at least partially cure the aldehyde-based resin.

In some embodiments, the composite lignocellulosic product can be particleboard and the resinated substrates can include, on a solids basis, about 0.15 wt %, about 0.3 wt %, about 0.5 wt %, about 1 wt %, or about 2 wt % to about 3 wt %, about 4 wt %, about 5 wt %, about 6 wt %, or about 7 wt % of the aldehyde scavenger and about 2 wt %, about 4 wt %, about 6 wt % or about 8 wt % to about 10 wt %, about 12 wt %, about 15 wt %, or about 18 wt % of the aldehyde-based resin, based on a dry weight of the substrates. In some embodiments, the composite lignocellulosic product can be medium density fiberboard and the resinated substrate can include, on a solids basis, about 0.15 wt %, about 0.3 wt %, about 0.5 wt %, about 1 wt %, or about 2 wt % to about 3 wt %, about 5 wt %, about 7 wt %, about 8 wt %, or about 9 wt % of the aldehyde scavenger and about 3 wt %, about 5 wt %, about 7 wt % or about 9 wt % to about 15 wt %, about 20 wt %, about 25 wt %, or about 27 wt % of the aldehyde-based resin, based on a dry weight of the substrates. In some embodiments, the composite lignocellulosic product can be plywood and the resinated substrate can include, on a solids basis, about 0.05 wt %, about 0.1 wt %, about 0.3 wt %, about 0.5 wt %, or about 0.7 wt % to about 1 wt %, about 1.3 wt %, about 1.5 wt %, about 1.7 wt %, about 2 wt %, or about 2.2 wt % of the aldehyde scavenger and about 0.2 wt %, about 0.5 wt %, about 0.7 wt % or about 1 wt % to about 2 wt %, about 3 wt %, about 4 wt %, about 5 wt %, or about 6 wt % of the aldehyde-based resin, based on a dry weight of the substrates. In some embodiments, the composite lignocellulosic product can be oriented strand board and the resinated substrate can include, on a solids basis, about 0.05 wt %, about 0.1 wt %, about 0.3 wt %, about 0.5 wt %, or about 0.7 wt % to about 1 wt %, about 1.3 wt %, about 1.5 wt %, about 1.7 wt %, about 2 wt %, or about 2.2 wt % of the aldehyde scavenger and about 0.2 wt %, about 0.5 wt %, about 0.7 wt % or about 1 wt % to about 2 wt %, about 4 wt %, about 5 wt %, about 8 wt %, or about 10 wt % of the aldehyde-based resin, based on a dry weight of the substrates.

In some embodiments, the resinated substrates can include about 5 wt %, about 6 wt %, about 8 wt %, about 10 wt %, or about 12 wt % to about 15 wt %, about 19 wt %, or about 24 wt % of water, based on a combined weight of the plurality of substrates, the aldehyde scavenger, the aldehyde-based resin, and any water added thereto during preparation of the resinated substrates. In some embodiments, the amount of water in the resinated substrates attributable to the substrates, e.g., moisture present in a plurality of lignocellulose substrates, can be at least 10 wt %, at least 12 wt %, at least 15 wt %, at least 16 wt %, at least 17 wt %, at least 18 wt %, at least 19 wt %, or at least 20 wt % to about 22 wt %, about 25 wt %, about 27 wt %, or about 30 wt % of the water in the resinated substrates, based on a combined weight of the plurality of substrates, the aldehyde scavenger, the aldehyde-based resin, and any water added thereto during preparation of the resinated substrates.

The binder composition can be cured via any number of methods, e.g., with the addition of one or more acids, bases, and/or catalysts, the application of heat and/or pressure, or any combination thereof, to produce the composite product. The amount of acid, base, and/or catalyst that can be added to the binder composition to initiate or start curing of the binder composition can be about 0.01 wt %, about 1 wt %, about 3 wt %, or about 5 wt % to about 10 wt %, about 15 wt %, or about 20 wt %, based on the combined weight of the aldehyde scavenger, the aldehyde-based resin, any acid, any base, and/or any catalyst.

As used herein, the terms "curing," "cured," and similar terms are intended to refer to the structural and/or morphological change that occurs in the resin composition as it is cured to cause covalent chemical reaction (crosslinking), ionic interaction or clustering, improved adhesion to a substrate, phase transformation or inversion, and/or hydrogen bonding. As used herein, the phrases "at least partially cure," "at least partially cured," and similar terms are intended to refer to the resin composition that has undergone at least some covalent chemical reaction (crosslinking), ionic interaction or clustering, improved adhesion to the substrate, phase transformation or inversion, and/or hydrogen bonding, but may also be capable of undergoing additional covalent chemical reaction (crosslinking), ionic interaction or clustering, improved adhesion to the substrate, phase transformation or inversion, and/or hydrogen bonding.

The resinated furnish can be subjected to a pressure during the at least partial cure of the binder composition. The pressure the resinated furnish can be subjected to during curing of the binder composition can vary and can be based, at least in part, on the particular product being manufactured. For example, the amount of pressure applied in a particleboard production process can be from about 1 MPa to about 5 MPa or from about 2 MPa to about 4 MPa. In another embodiment, the amount of pressure applied in a MDF production process can be from about 2 MPa to about 7 MPa or from about 3 MPa to about 6 MPa. The length of time the pressure can be applied can be from a low of about 15 second, about 30 seconds, about 1 minute, about 3 minutes, about 5 minutes, or about 7 minutes to a high of about 10 minutes, about 15 minutes, about 20 minutes, about 30 minutes, about 1 hour, about 2 hours, or more, which can depend, at least in part, on the particular product and/or the particular dimensions, e.g., thickness of the product. For example, the length of time the pressure and/or heat can be applied to the furnish can be from about 30 seconds to about 10 minutes, about 30 seconds to about 2 minutes, about 1 minute to about 3 minutes, about 1.5 minutes to about 4 minutes, or about 45 seconds to about 3.5 minutes.

The temperature the lignocellulosic substrates and the binder composition can be heated to during the at least partial cure of the binder composition can be from a low of about 100° C., about 125° C., about 150° C., or about 170° C. to a high of about 180° C., about 200° C., about 220° C., or about 250° C. The binder composition at the core or center of the product can be heated to a temperature ranging from a low of about 120° C., about 130° C., about 140° C., about 150° C., or about 155° C. to a high of about 160° C., about 170° C., about 180° C., about 190° C., about 195° C., or about 199° C.

Composite lignocellulosic products, such as particleboard, fiberboard, plywood, and oriented strand board, can have a thickness ranging from a low of about 1.5 mm, about 5 mm, or about 10 mm to a high of about 30 mm, about 50 mm, or about 100 mm Wood based or wood containing products can be formed into sheets or boards. The sheets or boards can have a length of about 1.2 m, about 1.8 m, about 2.4 m, about 3 m, or about 3.6 m. The sheets or boards can have a width of about 0.6 m, about 1.2 m, about 1.8 m, about 2.4 m, or about 3 m.

Another composite lignocellulosic product can include panels or other multi-layered products. For example, a composite lignocellulosic product can include two, three, four, five, six, seven, eight, nine, ten, or more individual lignocellulosic layers bonded together. The binder composition can be contacted with the lignocellulosic substrates of any one or more of the individual layers. In one embodiment, the individual lignocellulosic layers of a multi-layer product can be veneer. In another embodiment, the individual lignocellulosic layers of a multi-layer product can include a plurality of lignocellulosic substrates bonded to one another to produce an individual layer. In another embodiment, a multi-layer composite lignocellulosic product can include one or more individual layers that include veneer and one or more layers that include a plurality of lignocellulosic substrates bonded to one another to produce an individual layer.

Composite products in the shape or form of a panel, sheet, board, or the like can be in the form of a rectangular prism that includes six outer surfaces, i.e., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of a panel, sheet, board, or the like can have an average thickness, where the average thickness is the length or distance between the first and second surfaces.

If the composite product is in the form of a panel, sheet, board, or the like, the amount or length of time the mixture can be heated can range from a low of about 5 seconds per millimeter (s/mm), about 10 s/mm, about 12 s/mm, or about 15 s/mm to a high of about 17 s/mm, about 19 s/mm, about 21 s/mm, about 23 s/mm, about 25 s/mm, about 27 s/mm, about 30 s/mm, about 35 s/mm, about 40 s/mm, about 50 s/mm, or about 60 s/mm, where the length refers to the average thickness of the composite product. For example, the mixture can be heated for a time of about 7 s/mm to about 27 s/mm, about 9 s/mm to about 24 s/mm, about 11 s/mm to about 22 s/mm, about 8 s/mm to about 20 s/mm, about 14 s/mm to about 18 s/mm, about 6 s/mm to about 14 s/mm, about 10 s/mm to about 18 s/mm, or about 10 s/mm to about 16 s/mm, where the length refers to the average thickness of the composite product. In another embodiment, the mixture can be heated for a time less than 22 s/mm, less than 20 s/mm, less than 18 s/mm, less than 17 s/mm, less than 16 s/mm, less than 15 s/mm, less than 14 s/mm, less than 13 s/mm, or less than 12 s/mm, where the length refers to the average thickness of the composite product. In one specific embodiment, a composite product in the form of a panel, sheet, board, or the like and having an average thickness of about 15 mm and subjected to a total heating time of about 4 minutes would correspond to heating the mixture for about 16 s/mm. In at least one specific embodiment, the mixture can be heated to a temperature of about 160° C. to about 170° C. for a time of 13 s/mm to about 19 s/mm.

The composite product can have an internal bond strength from a low of about 0.3 MPa, about 0.32 MPa, about 0.34 MPa, about 0.35 MPa, about 0.37 MPa, about 0.4 MPa, about 0.42 MPa, about 0.48 MPa, about 0.52 MPa, about 0.55 MPa, or about 0.58 MPa to a high of about 0.69 MPa, about 0.75 MPa, about 0.83 MPa, about 0.9 MPa, about 0.97 MPa, about 1.05 MPa, about 1.15 MPa, about 1.2 MPa, about 1.25 MPa, about 1.3 MPa, about 1.35 MPa, about 1.4 MPa, about 1.45 MPa, about 1.5 MPa, about 1.55 MPa, about 1.6 MPa, or about 1.7 MPa, with suitable ranges including the combination of any two values. For example, the composite product can have an internal bond strength of about 0.35 MPa to about 0.55 MPa, about 0.4 MPa to about 0.6 MPa, about 0.48 MPa to about 0.69 MPa, about 0.59 MPa to about 0.86 MPa, about 0.55 MPa to about 0.9 MPa, or about 0.51 MPa to about 0.85 MPa. In one or more embodiments, the composite product can have an internal bond strength of at least 0.33 MPa, at least 0.32 MPa, at least 0.34 MPa, at least 0.38 MPa, at least 0.41 MPa, at least 0.45 MPa, at least 0.48 MPa, at least 0.51 MPa, at least 0.55 MPa, at least 0.58 MPa, at least 0.62 MPa, at least 0.66 MPa, at least 0.69 MPa, at least 0.72 MPa, at least 0.76 MPa, or at least 0.79 MPa. The internal bond strength can be determined according to ASTM D1037-12.

The composite lignocellulosic product can have a density of about 0.5 g/cm$^3$, about 0.55 g/cm$^3$, about 0.6 g/cm$^3$, about 0.63 g/cm$^3$, about 0.65 g/cm$^3$, about 0.67 g/cm$^3$, or about 0.7 g/cm$^3$ to about 0.75 g/cm$^3$, about 0.77 g/cm$^3$, about 0.8 g/cm$^3$, about 0.83 g/cm$^3$, about 0.85 g/cm$^3$, about 0.88 g/cm$^3$, about 0.93 g/cm$^3$, about 0.97 g/cm$^3$, about 1 g/cm$^3$, about 1.05 g/cm$^3$, about 1.1 g/cm$^3$, about 1.15 g/cm$^3$, or about 1.2 g/cm$^3$.

In one or more embodiments, the composite product can have a density less than 1 g/cm$^3$, less than 0.95 g/cm$^3$, less than 0.9 g/cm$^3$, less than 0.85 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$ and an internal bond strength of at least 0.3 MPa, at least 0.35 MPa, at least 0.4 MPa, at least 0.48 MPa, at least 0.51 MPa, at least 0.55 MPa, at least 0.58 MPa, at least 0.62 MPa, at least 0.65 MPa, or at least 0.69 MPa. In at least one specific embodiment, the composite product can have a density less than 0.8 g/cm$^3$ and internal bond strength of at least 0.48 MPa. In at least one other specific embodiment, the composite product can have a density less than 0.8 g/cm$^3$ and internal bond strength of at least 0.69 MPa. In at least one other specific embodiment, the composite product can have a density of less than 0.73 g/cm$^3$ and internal bond strength of at least 0.48 MPa. In still another embodiment, the composite product can have a density of less than 0.73 g/cm$^3$ and internal bond strength of at least 0.58 MPa.

Referring to particleboard in particular, particleboard made according to one or more embodiments discussed and described herein can meet or exceed the requirements for H-1, H-2, H-3, M-0, M-1, M-S, M-2, M-3i, LD-1, and/or LD-2 grade particleboard as described in the American National Standards Institute (ANSI) for particleboard, i.e., ANSI A208.1-2009 Particleboard, approved Feb. 2, 2009. Particleboard made according to one or more embodiments discussed and described herein can meet or exceed the requirements for PBU, D-2, D-3, and/or M-3 as defined by ANSI for particleboard, i.e., ANSI A208.1-2009 Particleboard, approved Feb. 2, 2009. For example, Tables A and B set out certain requirements for the different grades of particleboard. Referring to oriented strand board (OSB) in particular, OSB made according to one or more examples discussed and described herein can meet or exceed the U.S. Department of Commerce Voluntary Performance Standard PS 2. Referring to plywood in particular, plywood made according to one or more embodiments discussed and described herein can meet or exceed the U.S. Department of Commerce Voluntary Performance Standard PS-1 and/or PS-2.

The binder compositions can be used for gluing high average moisture content veneers with reduced blowouts and other moisture induced defects. For example, the binder composition can be mixed, blended, or otherwise combined with lignocellulosic substrates having an average moisture content of greater than 7 wt % and up to about 25 wt %, based on the dry weight of the lignocellulosic substrates. For example, the lignocellulosic substrates can have an average moisture content of about 3 wt %, about 5 wt %, about 7 wt %, about 9 wt %, about 11 wt %, or about 13 wt % to about 17 wt %, about 20 wt %, about 22 wt %, or about 25 wt %, based on the dry weight of the lignocellulosic substrates. In another embodiment, the lignocellulosic substrates can have an average moisture content from about 3 wt % to about 5 wt %, about 5 wt % to about 7 wt %, about 7 wt % to about 9 wt %, about 9 wt % to about 13 wt %, about 11 wt % to about 15 wt %, or about 13 wt % to about 20 wt % based on the dry weight of the lignocellulosic substrates.

The composite lignocellulosic products produced with the binder compositions discussed and described herein can exhibit a low level of formaldehyde emission. A suitable test for determining formaldehyde emission from a composite lignocellulosic product that includes an at least partially cured binder composition can include ASTM D6007 and ASTM E1333. For example, the composite lignocellulosic products containing an at least partially cured aldehyde-based resin can exhibit a formaldehyde emission of less than 5 part per million ("ppm"), less than 4 ppm, less than 3 ppm, less than 2 ppm, less than 1.8 ppm, less than 1.7 ppm, less than 1.6 ppm, less than 1.5 ppm, less than 1.3 ppm, less than 1.1 ppm, or less than 1 ppm.

In one or more embodiments, the composite products made with the binder can be structural products. The structural products can be formed by bonding a plurality of lignocellulose substrates together with the binder to provide a structural product for use as a structural member or support in the construction of floors, walls, roofs, and other structural components. As such, the binder or composite products made therewith can satisfy any one or more of the following standardized tests: ASTM D2559-12a(2018), Standard Specification for Adhesives for bonded Structural Wood Products for Use under Exterior Exposure Conditions; ASTM D3737-18e1, Standard Practice for Establishing Allowable Properties for Structural Glued Laminated Timber (Glulam); ASTM D5456-19, Standard Specification for Evaluation of Structural Composite Lumber Products; ASTM D5764-97a(2018), Standard Test Method for Evaluating Dowel-Bearing Strength of Wood and Wood-based Products; ASTM D6815-09(2015), Standard Specification for Evaluation of Duration of Load and Creep Effects of Wood and Wood-Based Products; ASTM D7247-17 Standard Test Method for Evaluating the Shear Strength of Adhesive Bonds in Laminated Wood Products of Elevated temperatures; ASTM D3535-07a(2013) Standard Test Method for Resistance to creep Under Static Loading for Structural Wood Laminating Adhesives Used Under Exterior Exposure Conditions; CSA O112.9 (2014) Evaluation of Adhesives for Structural Wood Products (Exterior Exposure); and/or CSA O112.10-2008 (R2017) Evaluation of Adhesives for Structural Wood Products (Limited Moisture Exposure). In some embodiments, the composite lignocellulose product can be a structural composite lumber. The structural composite lumber can be laminated veneer lumber, parallel strand lumber, and/or laminated strand lumber.

Process for Making Fiberglass Composite Products

Prior to using the fibers to make a fiberglass product, the fibers can be allowed to age for a period of time. For example, the fibers can be aged for a period of a few hours to several weeks before being used to make a fiberglass product. For fiberglass mat products the fibers can typically be aged for about 3 to about 30 days. Ageing the fibers includes simply storing the fibers at room temperature for the desired amount of time prior to being used in making a fiberglass product.

Illustrative fiberglass products can include, but are not limited to, fiberglass mats and fiberglass insulation. The process for binding loosely associated, non-woven mat or blanket of fibers can include, but is not limited to (1) contacting the fibers with the binder composition to produce a resinated substrate and (2) heating the resinated substrate to an elevated temperature sufficient to at least partially cure the binder composition. In some embodiments, in making fiberglass composite products, the resinated substrate can be heated at a temperature of about 75° C. to about 300° C., e.g., about 100° C. to about 250° C. The binder composition in the resinated substrate can be cured at an elevated temperature for a time ranging from about 1 second to about 15 minutes. The particular curing time can depend, at least in part, on the type of oven or other heating device design, the particular product being manufactured, and/or production or line speed.

Application of the binder composition can be accomplished by any conventional means, such as by soaking the mat in an excess of binder solution or suspension, a falling film or curtain coater, dipping, or the like. Excess binder composition can be removed, for example under vacuum.

In the making of non-woven fiber products, such as fiberglass mats, the binder composition can be formulated into a dilute aqueous solution and then applied, such as by a curtain coating, spraying, or dipping, onto fibers, such as glass fibers. The aqueous solution can be fresh water, process water, or a combination thereof. Binder compositions containing somewhere between about 1 wt % and about 50 wt % solids are typically used for making fiber products, including glass fiber products. For example, an aqueous binder composition can have a solids concentration ranging from a low of about 10 wt %, about 13 wt %, about 15 wt %, or about 18 wt % to a high of about 22 wt %, about 26 wt %, about 30 wt %, or about 33 wt %.

The amount of binder composition applied to the fiberglass product, e.g., a fiberglass mat, can vary considerably. Loadings typically can range from about 3 wt % to about 45 wt %, about 10 wt % to about 40 wt %, or from about 15 wt % to about 30 wt %, of nonvolatiles or solids of the binder composition, based on the dry weight of the bonded fiberglass product. For inorganic fibrous mats, the amount of binder composition applied to a fiberglass product can normally be confirmed by measuring the percent loss on ignition ("LOI") of the fiber mat product.

The aqueous solution of the binder composition can be blended with other additives or ingredients commonly used in the manufacture of fiber products and diluted with additional water to a desired concentration which is readily applied onto the fibers, such as by a curtain coater. Illustrative additives can be or can include, but are not limited to, dispersants, biocides, viscosity modifiers, pH adjusters, coupling agents, surfactants, lubricants, defoamers, and the like. For example, the binder composition can be added to an aqueous solution ("white water") of polyacrylamide ("PAA"), amine oxide ("AO"), hydroxyethylcellulose ("HEC"), or any combination thereof. In another embodiment, a coupling agent (e.g., a silane coupling agent, such as an organo silicon oil) can also be added to the solution.

The binder composition may be prepared by combining the binder composition and any additives in a relatively simple mixing procedure. The mixing procedure can be carried out at ambient temperature or at a temperature greater than ambient temperature, for example about 50° C. The binder composition can be used immediately or stored for a period of time and may be diluted with water to a concentration suitable for the desired method of application, such as by a curtain coater onto the glass fibers.

Fiberglass mats can be manufactured in a wet-laid or dry-laid process. In a wet-laid process, chopped bundles of fibers, having suitable length and diameter, can be introduced to an aqueous dispersant medium to produce an aqueous fiber slurry, known in the art as "white water." The white water can typically contain about 0.5 wt % fibers. The fibers can have a diameter ranging from a low of about 0.5 μm, about 5 μm, about 10 μm, or about 20 μm to a high of about 30 μm, about 35 μm, about 40 μm, about 45 μm, or about 50 μm, for example. The fibers can have a length ranging from a low of about 5 mm, about 10 mm, about 15 mm, or about 25 mm to a high of about 50 mm, about 70 mm, about 100 mm, or about 130 mm, for example. The fibers can be sized or unsized and wet or dry, as long as the fibers can be suitably dispersed within the aqueous fiber slurry.

The dispersing agent(s) can be present in an amount ranging from about 10 ppm to about 8,000 ppm, about 100 ppm to about 5,000 ppm, or from about 200 ppm to about 1,000 ppm. The introduction of one or more viscosity modifiers can reduce settling time of the fibers and can improve the dispersion of the fibers in the aqueous solution. The amount of viscosity modifier used can be effective to provide the viscosity needed to suspend the fibers in the white water as needed to form the wet laid fiber product. The optional viscosity modifier(s) can be introduced in an amount ranging from a low of about 1 cP, about 1.5 cP, or about 2 cP to a high of about 8 cP, about 12 cP, or about 15 cP (Brookfield Viscometer measured at 25° C.). For example, optional viscosity modifier(s) can be introduced in an amount ranging from about 1 cP to about 12 cP, about 2 cP to about 10 cP, or about 2 cP to about 6 cP. In one or more embodiments, the fiber slurry can include from about 0.03 wt % to about 25 wt % solids. The fiber slurry can be agitated to produce a uniform dispersion of fibers having a suitable consistency.

The fiber slurry, diluted or undiluted, can be introduced to a mat-forming machine that can include a mat forming screen, e.g., a wire screen or sheet of fabric, which can form a fiber product and can allow excess water to drain therefrom, thereby forming a wet or damp fiber mat. The fibers can be collected on the screen in the form of a wet fiber mat and excess water is removed by gravity and/or by vacuum assist. The removal of excess water via vacuum assist can include one or a series of vacuums.

The aqueous binder composition, after it is applied to the fibers, can be at least partially cured. For example, the fiberglass product can be heated to effect final drying and curing. The duration and temperature of heating can affect the rate of processability and handleability, degree of curing and property development of the treated substrate. As discussed and described above, the binder composition and fiber mixture can be heated sufficiently to cause the center or core of the composite product to reach a temperature ranging from a low of about 150° C., about 170° C., about 190° C., or about 220° C. to a high of about 250° C., about 270° C., about 290° C., about 305° C., or about 320° C. for a time ranging from a low of about 1 second, about 5 seconds, about 10 seconds, about 15 seconds or about 20 seconds to a high of about 30 seconds, about 45 seconds, about 60 seconds, about 90 seconds, about 120 seconds, about 150 seconds, or about 180 seconds to produce the composite product.

On heating, at least a portion of any water present in the binder composition can evaporate, and the composition can undergo at least partial curing. These processes can take place in succession or simultaneously. Alternatively or in addition to heating the fiberglass product catalytic curing can be used to cure the fiberglass product. Catalytic curing of the fiberglass product can include the addition of an acid catalyst. Illustrative acid catalysts can include, but are not limited to, ammonium chloride or p-toluenesulfonic acid.

In one or more embodiments, the drying and curing of the binder composition can be conducted in two or more distinct steps. For example, the composition may be first heated at a temperature and for a time sufficient to substantially dry but not to substantially cure the binder composition and then heated for a second time at a higher temperature and/or for a longer period of time to effect curing (cross-linking to a thermoset structure). Such a preliminary procedure, referred to as "B-staging," may be used to provide a binder-treated product, for example, in roll form, which may at a later stage be fully cured, with or without forming or molding into a particular configuration, concurrent with the curing process. This makes it possible, for example, to use fiberglass products which can be molded and cured elsewhere.

The fiber mat product can be formed as a relatively thin product of about 0.25 mm to a relatively thick product of about 25.4 mm. Other fiberglass products can have substantially greater thickness. For example, fiberglass insulation can have a thickness ranging from a low of about 5 cm, about 10 cm, about 15 cm, or about 20 cm to a high of about 30 cm, about 35 cm, about 40 cm, about 45 cm, or about 50 cm. Depending on formation conditions, the density of the product can also be varied from a relatively fluffy low density product to a higher density of about 0.096 g/cm$^3$ to about 0.16 g/cm$^3$ (about 6 to about 10 pounds per cubic foot) or higher.

The fibers can represent the principal material of the non-woven fiber products, such as a fiberglass mat product. For example, 60 wt % to about 90 wt % or about 60 wt % to about 99 wt % of the fiberglass product, based on the combined amount of binder and fibers can be composed of the fibers. The binder composition can be applied in an amount such that the cured binder constitutes from about 1 wt % to about 40 wt % of the finished fiberglass product. For example, the binder composition can be applied in an amount such that the cured binder constitutes a low from about 1 wt %, about 5 wt %, or about 10 wt % to a high of about 15 wt %, about 20 wt %, about 25 wt %, or about 30 wt %, based on a dry weight of the plurality of fibers in the finished fiberglass product.

Fiberglass products may be used by themselves or incorporated into a variety of products. For example, fiberglass products can be used as or incorporated into insulation batts or rolls, composite flooring, asphalt roofing shingles, siding, gypsum wall board, roving, micro glass-based substrate for printed circuit boards, battery separators, filter stock, tape stock, carpet backing, commercial and industrial insulation, and as reinforcement scrim in cementitious and non-cementitious coatings for masonry. Suitable processes for making fiberglass products can include those described in U.S. Pat. Nos. 8,053,528; 8,222,167; 8,257,554; 8,703,628; and 9,109,311.

In some embodiments, the composite product made with a plurality of fibers, e.g., glass fibers, can have an average dry tensile strength of at least 36,775 N/m, at least 38,000 N/m, or at least 40,000 N/m to about 45,000 N/m, about 50,000 N/m, or about 55,000 N/m, as measured according to ASTM D2105-01(2019). In some embodiments, the composite product made with a plurality of fibers, e.g., can have an average wet tensile strength of at least 19,575 N/m, at least 20,000 N/m, at least 23,000, or at least 25,000 N/m to about 30,000 N/m, about 35,000 N/m, or about 40,000 N/m, as measured according to ASTM D2105-01(2019). In some embodiments, the composite product made with a plurality of fibers, e.g., glass fibers, can have an average hot-wet % of at least 55%, at least 60%, or at least 65% to about 70%, about 75%, about 80%, or about 85%. In some embodiments, the composite product made with a plurality of fibers, e.g., glass fibers, can have an average tear strength of at least 4.9 N, about 5 N, about 5.2 N, about 5.5 N, about 5.7 N, or about 6 N to about 6.3 N, about 6.5 N, about 6.7 N, about 7 N, about 7.5 N, or about 8 N, as measured according to TAPPI T 414.

Process for Making Laminated Products

In some embodiments, the composite product can be or include a laminate of two or more substrates. The substrates can be or include cellulosic sheets, cotton fabrics, e.g., paper sheets and/or kraft sheets. In some embodiments, the cellulosic sheets of the substrate can include cellulose fibers from the group consisting of substantially delignified cellulose fibers, including pulped fibers, "chemical pulps," "thermomechanical pulps," recycled pulp fiber, bleached and unbleached paper and paper-like materials, non-woven mats, sheets or felts, and the like. The origin of the delignified cellulose can be derived from any of a large variety of sources, including wood and various other plant fibers, such as from agricultural by-products, and also including recycled cellulose. Delignified celluloses are characterized as having had most to substantially all the indigenous lignin and analogous naturally-occurring binders removed. Preferably, a majority of the cellulosic material in the substrate, e.g., 90% or 95% or more, consists of fibers from the above group, although blends of fibers may be used.

The term "kraft paper" refers to paper produced by the kraft process. The kraft process includes treating wood chips with a mixture of sodium hydroxide and/or sodium sulfide to break the bonds between the lignin and the cellulose contained in the wood chips to form or produce a wood pulp. Most of the lignin, i.e., greater than 50% of the lignin, in the wood chips can be separated from the cellulose to provide cellulose fibers that can then be formed into kraft paper.

The laminated product can include a plurality of substrates that have been saturated with the binder composition, where the binder composition has been at least partially cured. The laminate can also be or include a core section, a pigmented or printed decorative paper sheet, and an overlay. The core section can include a plurality of paper sheets. For example, the core section can be a plurality of kraft paper sheets. The pigmented or decorative paper sheet can be a single sheet of paper having a decorative image thereon. The overlay can be a layer of rayon and/or paper. The core section, the pigmented or decorative paper sheet, and the overlay can each be at least partially saturated with the binder composition. The binder composition can be at least partially cured to produce the laminate.

In making the laminate product, the substrate(s), e.g., paper sheet(s), can pass through a dip tank generally filled with a solution of the binder composition. The substrate can be saturated or "impregnated" with the resin during immersion in the tank. Excess resin can be removed from the substrate by opposed scraper bars or blades as the substrate leaves the dip tank. The substrates saturated or impregnated with the binder composition can then be moved to a drying zone to evaporate volatile components, such as solvents, and/or increase the molecular weight of the resin(s). For example, a binder composition-saturated decorative paper and a binder composition-saturated core kraft paper can be passed through one or more ovens. This juncture is conventionally called the "B-Stage." The B-stage can reduce the weight of the binder composition in amount ranging from about 1 wt % to about 15 wt % or about 5 wt % to about 10 wt %. However, the water content of the binder composition can be low enough that further drying of resin can be unnecessary. Said another way, the water content of the binder composition can be low enough that the B-staging process can be avoided.

The substrates saturated or impregnated with the binder composition can be removed from the drying zone and cut to size, stacked, and consolidated using a heated, high-pressure press. The substrates saturated or impregnated with the binder composition can be laid up to a desired number of plies. The substrates saturated or impregnated with the binder composition stacked sheets or plies can be pressed to a pressure ranging from about 3,000 kPa to about 15,000 kPa, e.g., about 5,500 kPa to about 10,500 kPa. The substrates saturated or impregnated with the binder composition can be heated to a temperature of about 35° C., about 60° C., about 100° C. or about 120° C. to a high of about 205° C., about 230° C., about 245° C., or about 260° C. In some embodiment, the substrates saturated or impregnated with the binder composition can be heated to a temperature of about 40° C. or about 80° C. to about 121° C., about 121° C. to about 232° C., about 232° C. to about 260° C., about 30° C. to about 60° C., about 40° C. to about 200° C., about 100° C. to about 250° C., or about 120° C. to about 200° C.

The substrates saturated or impregnated with the binder composition can be pressed for a time of about 1 minute, about 15 minutes, or about 30 minutes or to about 90 minutes, about 120, or about 150 minutes. In another embodiment, the substrates saturated or impregnated with the binder composition can be pressed for a time of about 1 minute to about 15 minutes, about 15 minutes to about 30 minutes, about 30 minutes to about 60 minutes, about 60 minutes to about 90 minutes, about 90 minutes to about 120 minutes, about 120 minutes to about 150 minutes, about 2 minutes to about 25 minutes, about 5 minutes to about 80 minutes, or about 40 minutes to about 110 minutes. While in the press, the aldehyde-based resin can sufficiently flow to displace at least a portion of any air present between the plies and undergo at least partial curing to produce the composite product. After heating and/or pressing the substrates saturated or impregnated with the binder composition, the heated and/or pressed substrates can be cooled, e.g., to room temperature.

The substrates saturated or impregnated with the binder composition can include about 0.1 wt %, about 1 wt %, about 10 wt %, or about 20 wt % to a high of about 70 wt %, about 80 wt %, about 90 wt %, or about 99 wt % of the binder composition, based on the weight of the substrates saturated or impregnated with the binder composition. For example, the substrates saturated or impregnated with the binder composition can include about 0.1 wt % to about 5 wt %, about 5 wt % to about 15 wt %, about 15 wt % to about 25 wt %, about 25 wt % to about 35 wt %, about 35 wt % to about 55 wt %, about 55 wt % to about 65 wt %, about 65 wt % to about 75 wt %, about 75 wt % to about 85 wt %, about 85 wt % to about 95 wt %, or about 95 wt % to about 99 wt % of the binder composition, based on the weight of the substrates saturated or impregnated with the binder composition.

The laminates can be sanded, cut to size, and/or otherwise additionally finished or processed for use as decorative surfaces for desktops, tabletops, wall panels and the like. The laminate can be glued to a base substrate such as particleboard with adhesives such as contact cement or urea-based adhesives. The laminates can provide a flat surface or the laminates can be made in such a manner so as to render them post-formable by the application of heat. Post formable laminates can be used to form counter tops where the front edge is formed into a lip and the back edge is formed up into a back-splash area. Post-forming laminates can be made by under-curing in the heated, high-pressure press.

In some embodiments, one or more aqueous polymer dispersions can be added to the binder composition. The addition of the aqueous polymer dispersion can increase the flexibility of the binder composition saturated substrate. Suitable aqueous polymer dispersions can be or can include, but are not limited to, acrylate, methacrylate, vinyl acetate homopolymers, styrene/acrylate polymer, styrene/methacrylate polymer, polybutadiene/styrene polymers, or any combination thereof. If present, the aqueous polymer dispersion can be added in an amount of about 0.1 wt %, about 1 wt %, about 5 wt %, or about 15 wt % to about 25 wt %, about 35 wt %, or about 50 wt %, based on the combined weight of the binder composition and the aqueous polymer dispersion.

A plasticizer such as a thermoplastic latex can be added to the binder composition to give or otherwise impart the treated paper pleatability. One or more lubricants can also be added to the binder composition to facilitate or promote the release of the laminate from the pressure rolls.

One or more amides and/or surfactants can be added to the binder composition. Adding a surfactant to the binder composition can improve the penetration ability or penetration characteristics of the resin(s). Illustrative surfactants can include, but are not limited to, a material selected from the group consisting of formamide, N-methyl formamide, NN-dimethyl formamide, N-ethyl formamide, NN-diethyl formamide, N,N-diphenyl formamide and N-methylformanilide can be included in the binder composition. In one embodiment, formamide can be combined with the binder composition. The amide can be added to the binder composition in an amount of about 0.5 wt %, about 1 wt %, or about 2 wt % to a high of about 5 wt %, about 10 wt %, or about 15 wt %, based on the total weight of the binder composition. Illustrative surfactants include SURFYNOL® or sodium dodecyl sulfate. The surfactant can be added to the binder composition at any time. For example, the surfactant can be added to the binder composition just prior to substrate saturation in amounts ranging from a low of about 0.01 wt %, about 1 wt %, about 2 wt %, or about 5 wt % to a high of about 7 wt %, 10 wt %, or about 15%, based on the weight of the binder composition. The resin penetration can be achieved without increasing the relative amount of organic solvent in the resin. The ability to achieve a balanced ratio of water to organic solvent can be important because a higher organic solvent content can detrimentally lower the flash point of the binder composition while a higher water content (which raises the flash point) can detrimentally affect the penetration rate of the resin into the paper. By including formamide or an equivalent with the binder composition, a reduction in the amount of organic solvent relative to water can be achieved while maintaining the resin's penetration characteristics. For example, an enhanced penetration can be provided without an undesirable lowering of the flash point of the laminating resin.

The composite product can include about 0.003 wt %, about 0.01 wt %, about 0.03 wt %, about 0.06 wt %, about 0.1 wt %, about 0.5 wt %, about 0.7 wt %, about 1 wt %, about 1.3 wt %, or about 2 wt % to about 3.5 wt %, about 3.8 wt %, about 4 wt %, about 6 wt %, about 8 wt %, about 10 wt %, about 10.5 wt %, about 10.8 wt %, or about 11 wt % of the bifunctional quaternary ammonium salt, based on a dried weight of the composite product. In some embodiments, the composite product can be particleboard and the particleboard can include about 0.06 wt %, about 0.1 wt %, or about 0.5 wt % to about 0.7 wt %, about 1 wt %, about 3 wt %, about 4 wt %, about 6 wt %, or about 8 wt % of the bifunctional quaternary ammonium salt, based on the dried weight of the particleboard. In some embodiments, the composite product can be medium density fiberboard and the medium density fiberboard can include about 0.01 wt %, about 0.03 wt %, about 0.05, about 0.07, about 0.1, about 0.3, about 0.5 wt %, about 0.7 wt %, about 1 wt %, about 2 wt %, or about 3 wt % to about 6 wt %, about 8 wt %, about 9.5 wt %, about 10.8 wt %, or about 11 wt % of the bifunctional quaternary ammonium salt, based on the dried weight of the medium density fiberboard. In some embodiments, the composite product can be plywood and the plywood can include about 0.003 wt %, about 0.1 wt %, or about 0.5 wt % to about 0.7 wt %, about 1 wt %, or about 2 wt % of the bifunctional quaternary ammonium salt, based on the dried weight of the plywood. In some embodiments, the composite product can be oriented strand board and the oriented strand board can include about 0.003 wt %, about 0.01 wt %, about 0.05, about 0.1 wt %, or about 0.5 wt % to about 1 wt %, about 2 wt %, or about 4 wt % of the bifunctional quaternary ammonium salt, based on the dried weight of the oriented strand board. In some embodiments, the composite product can be a fiberglass mat and the fiberglass mat include about 0.003 wt %, about 0.01 wt %, about 0.05, about 0.1 wt %, about 0.5 wt %, or about 1 wt % to about 2 wt %, about 4 wt % about 6 wt %, or about 8 wt % of the bifunctional quaternary ammonium salt, based on the dried weight of the fiberglass mat. In some embodiments, the composite product can be fiberglass insulation and the fiberglass insulation can include about 0.5 wt %, about 0.7 wt %, about 1 wt %, about 2 wt %, or about 4 wt % to about 6 wt %, about 8 wt %, about 10 wt %, or about 11 wt % of the bifunctional quaternary ammonium salt, based on the dried weight of the fiberglass insulation.

EXAMPLES

In order to provide a better understanding of the foregoing discussion, the following non-limiting examples are offered. Although the examples can be directed to specific embodiments, they are not to be viewed as limiting the invention in any specific respect. All parts, proportions, and percentages are by weight unless otherwise indicated.

Experiment 1

The aldehyde-based resin used in all examples was a urea-formaldehyde resin that had a non-volatiles content of about 65 wt %, a formaldehyde to urea molar of about 1.25:1, a viscosity of about 850 cP, and a pH of about 7.7. The inventive aldehyde scavenger used in Examples 1 and 2 was a mixture that included about 45 wt % of urea, about 50 wt % of choline chloride (about 98 wt % choline chloride and about 2 wt % of water) and about 5 wt % of water. The mixture of urea, choline chloride, and water was heated to a temperature of about 70° C. and mixed for about 30 min to produce the aldehyde scavenger. The comparative aldehyde scavenger (CEx. 1) was an aqueous urea solution that included about 45 wt % of urea. The binder compositions used in CEx. 1 and Ex. 1 had a total formaldehyde to total urea molar ratio of about 1.1:1 and the binder composition used in Ex. 2 had a total formaldehyde to total urea molar ratio of about 1.18:1.

All boards were manufactured as a single layer (homogeneous). A press time series was conducted that used the comparative aldehyde scavenger to determine the minimum press time (90 sec) and then additional samples were made at +30 seconds and +60 seconds. The inventive aldehyde scavenger (Ex. 1) was then run at the same press times and another press time that was 15 seconds less. A third set was made with the inventive aldehyde scavenger (Ex. 2) at the higher total formaldehyde to total urea molar ratio to evaluate the scavenging capability of the added choline chloride. All boards were tested for internal bond strength (IB) and formaldehyde emissions.

TABLE 1

| Parameters | | | |
|---|---|---|---|
| Furnish | Southern Yellow Pine | UF Resin (solids on ODW) | 6% |
| Dimensions | 35.6 cm 35.6 cm × 0.95 cm<br>50.8 cm × 50.8 cm × 0.95 cm | Target Density | 0.77 g/cm3 |
| Scavenger | CEx. 1: Urea Sol. (45%)<br>Ex. 1 and 2: Urea (45%) and Choline Chloride | Press Temp | 157.2° C. |

The formaldehyde emission for all three examples was not statistically different. A statistically significant increase in internal bond strength, however, was observed for both Ex. 1 and Ex. 2. Table 2 below shows the internal bond strength values for each example. The reported internal bond strength values are an average internal bond obtained by measuring 10 samples for each example.

TABLE 2

| Internal Bond Strength | | |
|---|---|---|
| | Press Time | IB (kPa) |
| CEx. 1 | 75 | 253.7 |
| Ex. 1 | 75 | 273.1 |
| Ex. 2 | 75 | 278.5 |
| CEx. 1 | 90 | 251.6 |
| Ex. 1 | 90 | 368.2 |
| Ex. 2 | 90 | 419.2 |
| CEx. 1 | 120 | 655.0 |
| Ex. 1 | 120 | 805.3 |
| Ex. 2 | 120 | 886.6 |
| CEx. 1 | 150 | 791.5 |
| Ex. 1 | 150 | 943.9 |
| Ex. 2 | 150 | 925.3 |

As shown in Table 2, the inventive binder compositions produced boards that had a significant increase in internal bond strength relative to the comparative example and the increase in internal bond strength for Ex. 1 and Ex. 2 was statistically significant as compared to the comparative examples. There was no statistical difference in the average modulus of rupture (MOR) and the average modulus of elasticity (MOE) values for the examples.

Experiment 2

A second set of experiments was carried out to further evaluate the binder compositions. The aldehyde-based resin used in all examples was a urea-formaldehyde resin that had a non-volatiles content of about 65 wt %, a formaldehyde to urea molar of about 1.4:1, a viscosity of about 500 cP, and a pH of about 8.4. The aldehyde scavenger used in Examples 3-5 was made according to the following procedure. A mixture that included 45 wt % of urea and an aqueous 70 wt % solution of choline chloride was prepared and heated to a temperature of about 65° C. and vacuum distilled to reduce the water content to about 5 wt %. The Aldehyde scavenger used in the Comparative Examples CExs. 2-4 was the same 45 wt % aqueous urea solution used in Experiment 1. Three different total formaldehyde to total urea molar ratios were evaluated, i.e., a MR of about 0.8:1 (CEx. 2 and Ex. 3), about 1:1 (CEx. 3 and Ex. 4), and about 1.2:1 (CEx. 4 and Ex. 5), for each example. All boards were tested for internal bond strength (IB) and formaldehyde emissions.

TABLE 3

| Parameters | | | |
|---|---|---|---|
| Furnish | Southern Yellow Pine | UF Resin (solids on ODW) | 6% |
| Dimensions | 35.6 cm 35.6 cm × 0.95 cm<br>50.8 cm × 50.8 cm × 0.95 cm | Target Density | 0.72 g/cm3 |
| Scavenger | Comp. Exs. 2-4 - Urea Sol. (45%)<br>Ex. 3-5 - Urea (45%) and Choline Chloride | Press Temp. | 157.2° C. |

The formaldehyde emission for all examples examples was not statistically different. A statistically significant increase in internal bond strength, however, was observed Examples 3-5. Table 3 below shows the internal bond strength values for each example. The reported internal bond values are an average internal bond obtained by measuring 10 samples for each example.

TABLE 4

| Internal Bond Strength | | | |
|---|---|---|---|
| | F:U MR | Press Time | IB (kPa) |
| CEx. 3 | 1:1 | 120 | failed |
| Ex. 4 | 1:1 | 120 | 592.9 |
| CEx. 4 | 1.2:1 | 120 | 575.0 |
| Ex. 5 | 1.2:1 | 120 | 688.0 |
| CEx. 2 | 0.8:1 | 135 | failed |
| Ex. 3 | 0.8:1 | 135 | 205.4 |
| CEx. 3 | 1:1 | 135 | 575.0 |
| Ex. 4 | 1:1 | 135 | 785.3 |
| CEx. 4 | 1.2:1 | 135 | 868.0 |
| Ex. 5 | 1.2:1 | 135 | 992.15 |
| CEx. 2 | 0.8:1 | 150 | failed |
| Ex. 3 | 0.8:1 | 150 | 333.7 |
| CEx. 3 | 1:1 | 150 | 647.4 |

TABLE 4-continued

| Internal Bond Strength | | | |
|---|---|---|---|
| | F:U MR | Press Time | IB (kPa) |
| Ex. 4 | 1:1 | 150 | 874.2 |
| CEx. 4 | 1.2:1 | 150 | 689.4 |
| Ex. 5 | 1.2:1 | 150 | 1,056.9 |
| CEx. 2 | 0.8:1 | 165 | 216.5 |
| Ex. 3 | 0.8:1 | 165 | 315.1 |
| CEx. 3 | 1:1 | 165 | 797.7 |
| Ex. 4 | 1:1 | 165 | 965.3 |
| CEx. 2 | 0.8:1 | 180 | 297.1 |
| Ex. 3 | 0.8:1 | 180 | 499.2 |
| CEx. 3 | 1:1 | 180 | 726.7 |
| Ex. 4 | 1:1 | 180 | 1,044.6 |
| CEx. 2 | 0.8:1 | 195 | 384.0 |
| Ex. 3 | 0.8:1 | 195 | 487.4 |
| CEx. 2 | 0.8:1 | 210 | 370.2 |
| Ex. 3 | 0.8:1 | 210 | 529.5 |

As shown in Table 4, the inventive binder compositions produced boards that had a significant increase in internal bond strength relative to the comparative example and the increase in internal bond strength for Ex. 3-5 was statistically significant as compared to the comparative examples. There was no statistical difference in the average MOR and the average MOE values for the examples.

Experiment 3

A third set of experiments was carried out to evaluate the binder compositions for use in making non-woven fiberglass mats. A stock binder composition (SB1) was prepared according to the following procedure. About 1,172 g of an aqueous urea-formaldehyde concentrate (UFC) that had a concentration of about 85 wt %, and molar ratio of formaldehyde to urea of about 4.6 was added to a glass reactor with agitation. About 15.91 g of diethylenetriamine was added and the mixture was agitated for about 5 minutes. About 570.19 g of an aqueous 50 wt % formaldehyde solution was added and the pH was measured to be about 4. About 94.82 g of a 28 wt % ammonium hydroxide solution was added to the reaction mixture and the reaction mixture was heated to a temperature of about 73° C. The pH at this point was measured to be about 9. About 478.6 g of solid urea was added to provide a molar ratio of formaldehyde to urea of about 2.5 and the reaction mixture was heated to a temperature of about 83° C. The reaction mixture was held at about 83° C. for about 20 minutes before being heated to a temperature of about 90° C. The pH of the reaction mixture was adjusted to about 5 to about 6 by adding about 50 g of an 8% sulfuric acid and the reaction mixture was allowed to react to a viscosity of about "G-J", as measured by Gardner-Holt bubble tubes. Once the target viscosity was reached, the pH was adjusted to about 7 by adding about 8 g of a 50% sodium hydroxide solution and the reaction mixture was cooled to a temperature of about 50° C. Then water, in an amount of about 5 wt % of the total weight of the reaction mixture was distilled. About 407.28 g the aldehyde scavenger was added so that the reaction mixture had a formaldehyde to urea molar ratio of about 1.77. The mixture was then brought to a temperature of about 70° C. and held for about 45 minutes. The reaction mixture was cooled to a temperature below 35° C. and an addition of about 12 g of a 28% ammonium hydroxide solution was added to produce the stock binder composition SB1. The stock binder composition SB1 was used to prepare a control inventive binder composition (Ex. 6) and two additional inventive binder compositions (Ex. 7 and Ex. 8). The stock binder composition SB1 had a pH of about 8.32, a refractive index (RI) of about 1.4795, a viscosity of about 320 cP at a temperature of about 25° C., a solids content of about 70 wt %, and a stability of greater than 2 weeks.

The control binder composition (Ex. 6) was prepared by diluting the stock binder composition SB1 with tap water to produce a binder composition that included about 14.2 wt % of a urea-formaldehyde resin and free urea, about 0.8 wt % of choline chloride, and about 85 wt % of water, where the 14.2 wt % of urea-formaldehyde resin included about 0.8 wt % of free urea. The binder of Ex. 7 was prepared by diluting the stock binder composition SB1 with tap water and adding a latex to produce a binder composition that included about 13.49 wt % of urea-formaldehyde resin, about 0.76 wt % of choline chloride, about 0.75 wt % of latex, and about 85 wt % of water, where the 13.49 wt % of urea-formaldehyde resin included about 0.8 wt % of free urea. The binder of Ex. 8 was prepared by diluting the stock binder composition SB1 with tap water and adding SMA to produce a binder composition that included about 13.92 wt % of urea-formaldehyde resin, about 0.78 wt % of choline chloride, about 0.3 wt % of SMA, and about 85 wt % of water, where the 13.92 wt % of urea-formaldehyde resin included about 0.8 of free urea.

A comparative stock binder composition (CSB1) was prepared according to the following procedure. About 1,240 g of an aqueous urea-formaldehyde concentrate (UFC) that had a concentration of about 85 wt %, and molar ratio of formaldehyde to urea of about 4.6 was added to a glass reactor with agitation. About 29.98 g of diethylenetriamine was added and the mixture was agitated for about 5 minutes. About 26.89 g of epichlorohydrin was then added to the mixture and mixed for another 5 minutes. About 1,360.20 g of an aqueous 50 wt % formaldehyde solution was added and the pH was measured to be about 8.5. About 229.08 g of a 28 wt % ammonium hydroxide solution was added to the reaction mixture and the reaction mixture was heated to a temperature of about 73° C. The pH at this point was measured to be about 9. About 829.52 g of solid urea was added to provide a molar ratio of formaldehyde to urea of about 2.5 and the reaction mixture was heated to a temperature of about 83° C. The reaction mixture was held at about 83° C. for about 20 minutes before being heated to a temperature of about 90° C. The pH of the reaction mixture was adjusted to about 5 to about 6 by adding about 8.2 g of an 8% sulfuric acid and the reaction mixture was allowed to react to a viscosity of about "H-J", as measured by Gardner-Holt bubble tubes. Once the target viscosity was reached, the pH was adjusted to about 7 by adding about 9.43 g of a 50% sodium hydroxide solution and the reaction mixture was cooled to a temperature of about 50° C. Then water, in an amount of about 4 wt % of the total weight of the reaction mixture was distilled. About 284 g of urea was added to provide a formaldehyde to urea molar ratio of about 2:1. The mixture was then brought to a temperature of about 70° C. and held for about 45 minutes. The reaction mixture was cooled to a temperature below 35° C. and an addition of about 19.68 g of a 28% ammonium hydroxide solution was added to produce the comparative stock binder composition CSB1 The comparative stock binder composition CSB1 had a pH of about 8, a refractive index (RI) of about 1.4625, a viscosity of about 215 cP at a temperature of about 25° C., and a solids content of about 62.5 wt %.

A comparative binder composition (CEx. 5) was produced by adding tap water and latex to the comparative stock binder composition CSB1 to produce the comparative binder CEx. 5 that included about 14.25 wt % of urea-formaldehyde polymer, about 0.75 wt % of latex, and about 85 wt % of water.

A first set of handsheets that had a size of about 28 cm×about 28 cm (about 11" by 11") were prepared with the binder compositions of Exs. 6-8 and CEx. 5. The binders were added to a white water that included glass fibers to produce a mixture. The mixture was drained on a screen and vacuumed at a rate to provide a loss on ignition of about 15%. The wet webs were placed on a kettle stand and clamped. A plastic cup was placed onto the sheet and water was added via an addition funnel until the mat touched the surface below it. The amount of water was weighed and recorded. The handsheet conditions that were used to make the wet webs are shown in Table 5 below.

TABLE 5

| Handsheet Conditions | |
|---|---|
| Glass Fiber | 1.25" Owens Corning |
| White Water | TAMKO PAA |
| Target Basis Weight | 835 g per 929 $cm^2$ |
| Target Loss on Ignition | 15% |

The wet handsheet performance results of Exs. 6-8 and CEx. 5 are shown in Table 6 below. The average wet-web volume values were the average of 3 separate measurements.

TABLE 6

Wet Handsheet Properties

| Binder | Avg. Wet-Web Volume (g of water) | Wet-Web Volume Std. Dev. |
|---|---|---|
| CEx. 5 | 148.6 | 1.4 |
| Ex. 6 | 81.9 | 13.3 |
| Ex. 7 | 114.5 | 9.2 |
| Ex. 8 | 174.4 | 21.2 |

As shown in Table 6, Ex. 8 that included the SMA performed similarly to CEx. 5 that included the latex. Ex. 8 and CEx. 5 each performed better than Ex. 6 (no SMA or latex) and Ex. 7 (included latex). Ex. 7, however, still showed an improvement over Ex. 6 (no SMA or latex).

A second set of handsheets that had a size of about 28 cm×about 28 cm (about 11" by 11") were prepared with the binder compositions of Exs. 6-8 and CEx. 5. The binders were added to a white water that included the glass fibers to produce a mixture. The mixture was drained on a screen and vacuumed at a rate to provide a loss on ignition of about 15% to produce wet handsheets. The binder compositions in the wet handsheets were then cured. The handsheet study conditions that were used are shown in Table 7.

TABLE 7

| Handsheet Study Conditions | | |
|---|---|---|
| Glass Fiber | | 1.25" Owens Corning |
| White Water | | TAMKO PAA |
| Cure Conditions | | |
| | Ex. 6 | 10 seconds at 260° C. |
| | Ex. 7 | 10 seconds at 265° C. |
| | Ex. 8 | 10 seconds at 250° C. |
| | CEx. 5 | 10 seconds at 240° C. |
| Target Basis Weight | | 835 g per 929 $cm^2$ |
| Target Loss on Ignition | | 15% |

The tear strength, dry tensile strength, wet tensile strength, % hot-wet properties are shown in Table 7 below. The average values are the average of 8 separate measurements.

TABLE 8

Cured Handsheet Product Properties

| Binder | Avg. Tear Strength (N) | Tear Strength (N) Std. Dev. | Avg. Dry Tensile (kg/7.62 cm) | Dry Tensile Std. Dev. (kg/7.62 cm) | Avg. Wet Tensile (kg/7.62 cm) | Wet Tensile Std. Dev. (kg/7.62 cm) | Avg. % Hot-Wet | % Hot-Wet Std. Dev. |
|---|---|---|---|---|---|---|---|---|
| CEx. 5 | 4.362 | 1.825 | 38.1 | 3.2 | 21.9 | 4.6 | 57.6 | 11.8 |
| Ex. 6 | 6.802 | 1.495 | 35.0 | 4.3 | 22.6 | 4.1 | 65.8 | 15.9 |
| Ex. 7 | 5.749 | 2.387 | 39.2 | 2.5 | 25.0 | 3.8 | 63.4 | 6.9 |
| Ex. 8 | 7.045 | 2.384 | 32.9 | 4.9 | 25.7 | 3.5 | 79.9 | 17.3 |

As shown in Table 8, Ex. 8 that included SMA had the greatest % hot-wet and was statistically different from CEx. 5 that included the latex. Ex. 7 with the latex had the greatest dry tensile and performed similarly to CEx. 5 that included the latex, whereas Ex. 8 with the SMA had the lowest dry tensile and performed similarly to Ex. 6 (no latex or SMA). CEx. 5 and Exs. 6-7 all had statistically equivalent wet tensile strengths. The tear strength of CEx. 5 was statistically lower than that of Ex. 8, with Exs. 6-8 all being statistically equivalent.

Experiment 4

A third set of experiments was carried out to evaluate the binder compositions for use in making non-woven fiberglass mats.

A second stock binder composition (SB2) was prepared according to the following procedure. About 844.1 g of an aqueous urea-formaldehyde concentrate (UFC) that had a concentration of about 85 wt %, and molar ratio of formaldehyde to urea of about 4.6 was added to a glass reactor with agitation. About 19.7 g of epichlorohydrin was added via syringe and the reaction mixture was allowed to mix for about 5 minutes. About 21.9 g of diethylenetriamine was added and the mixture and the mixture was agitated for about 5 minutes. About 925.8 g of an aqueous 50 wt % formaldehyde solution was added and the pH was measured to be about 8. About 155.9 g of a 28 wt % ammonium hydroxide solution was added to the reaction mixture and the reaction mixture was heated to a temperature of 73° C. The pH at this point was measured to be about 9. About 564.6 g of solid urea was added to provide a molar ratio of formaldehyde to urea of about 2.5 and the reaction mixture was heated to a temperature of about 83° C. The reaction mixture was held at about 83° C. for about 20 minutes before being heated to a temperature of about 90° C. The pH was adjusted to about 5 to about 6 by adding about 6 g of an 8% sulfuric acid and the reaction mixture was allowed to react to desired viscosity of "G-J", as measured by Gardner-Holt bubble tubes. Once the target viscosity was reached, the pH is adjusted to about 7 by adding about 8 g of a 50% sodium hydroxide solution and the reaction mixture was cooled to a temperature of about 50° C. Then water, in an amount of about 6 wt % of the total weight of the reaction mixture, was distilled. About 300 g of an aldehyde scavenger was added so that the reaction mixture had a formaldehyde to urea molar ratio of about 1.925. The mixture was brought to a temperature of about 70° C. and held for about 45 minutes. The reaction mixture was then cooled to a temperature of less than 35° C. and an addition of about 13.4 g of a 28% ammonium hydroxide solution was added to produce a stock binder composition. The stock binder composition SB2 had a pH of about 8, a refractive index (RI) of about 1.4765, a viscosity of about 300 cP at a temperature of about 25° C., a solids content of about 67 wt %, and a stability of greater than 2 weeks. The stock binder composition SB2 was used to prepare two inventive binder compositions (Ex. 9 and Ex. 10).

The binder of Ex. 9 was prepared by diluting the stock binder composition SB2 with tap water and adding a latex to produce a binder composition that included about 13.54 wt % of urea-formaldehyde resin, about 0.71 wt % of choline chloride, about 0.75 wt % of latex, and about 85 wt % of water, where the 13.54 wt % of urea-formaldehyde resin included about 0.8 of free urea. The binder of Ex. 10 was prepared by diluting the stock binder composition SB2 with tap water and adding SMA to produce a binder composition that included about 13.965 wt % of urea-formaldehyde polymer, about 0.735 wt % of choline chloride, about 0.3 wt % of SMA, and about 85 wt % of water, where the 13.965 wt % of urea-formaldehyde resin included about 0.8 of free urea.

A third stock binder composition (SB3) was prepared according to the following procedure. About 844.05 g of an aqueous urea-formaldehyde concentrate (UFC) that had a concentration of about 85 wt %, and molar ratio of formaldehyde to urea of about 4.6 was added to a glass reactor with agitation. About 19.67 g of epichlorohydrin was added via syringe and the reaction mixture was allowed to mix for about 5 minutes. About 21.9 g of diethylenetriamine was added and the mixture and the mixture was agitated for about 5 minutes. About 925.9 g of an aqueous 50 wt % formaldehyde solution was added and the pH was measured to be about 8. About 155.9 g of a 28 wt % ammonium hydroxide solution was added to the reaction mixture and the reaction mixture was heated to a temperature of 73° C. The pH at this point was measured to be about 9. About 564.6 g of solid urea was added to provide a molar ratio of formaldehyde to urea of about 2.5 and the reaction mixture was heated to a temperature of about 83° C. The reaction mixture was held at about 83° C. for about 20 minutes before being heated to a temperature of about 90° C. The pH was adjusted to about 5 to about 6 by adding about 6 g of 8% sulfuric acid and the reaction mixture was allowed to react to desired viscosity of "G-J", as measured by Gardner-Holt bubble tubes. Once the target viscosity was reached, the pH is adjusted to about 7 by adding about 8 g of a 50% sodium hydroxide solution and the reaction mixture was cooled to a temperature of about 50° C. Then water, in an amount of about 5 wt % of the total weight of the reaction mixture, was distilled. About 450 g of an aldehyde scavenger was added so that the reaction mixture had a formaldehyde to urea molar ratio of about 1.90. The mixture was brought to a temperature of about 70° C. and held for about 45 minutes. The reaction mixture was then cooled to a temperature of less than 35° C. and an addition of about 13.4 g of a 28% ammonium hydroxide solution was added to produce the stock binder composition SB3. The stock binder composition SB3 had a pH of about 8, a refractive index (RI) of about 1.4770, a viscosity of about 280 cP at a temperature of about 25° C., a solids content of about 67 wt %, and a stability of greater than 2 weeks. The stock binder composition SB3 was used to prepare two inventive binder compositions (Ex. 11 and Ex. 12).

The binder of Ex. 11 was prepared by diluting the stock binder composition SB3 with tap water and adding a latex to produce a binder composition that included about 13.29 wt % of urea-formaldehyde resin, about 0.96 wt % of choline chloride, about 0.75 wt % of latex, and about 85 wt % of water, where the 13.29 wt % of urea-formaldehyde resin included about 0.8 wt % of free urea. The binder of Ex. 12 was prepared by diluting the stock binder composition SB3 with tap water and adding SMA to produce a binder composition that included about 13.71 wt % of urea-formaldehyde polymer, about 0.99 wt % of choline chloride, about 0.3 wt % of SMA, and about 85 wt % of water, where the 13.71 wt % of urea-formaldehyde resin included about 0.8 wt % of free urea.

A second comparative stock binder composition (CSB2) was prepared again according to the same procedure as the first comparative stock binder composition CSB1 was prepared. A comparative example (CEx. 7) was prepared by adding tap water to the stock binder composition CSB2 to produce the comparative binder composition CEx. 7 that contained about 15 wt % of the urea-formaldehyde resin and about 85 wt % of water. A comparative example (CEx. 8) was prepared by adding tap water and latex to the comparative stock binder composition CSB2 to produce the comparative binder composition CEx. 8 that contained about 13.29 wt % of the urea-formaldehyde resin, about 0.75 wt % of the latex, and about 85 wt % of water. A comparative example (CEx. 9) was prepared by adding tap water and SMA to the comparative stock binder composition CSB2 to produce the comparative binder composition CEx. 9 that contained about 13.71 wt % of the urea-formaldehyde resin, about 0.3 wt % of the SMA, and about 85 wt % of water.

A set of handsheets that had a size of about 28 cm×about 28 cm (about 11" by 11") were prepared with the binder compositions of Exs. 9-12 and CExs. 7-9. The binders were added to a white water that included glass fibers to produce a mixture. The mixture was drained on a screen and vacuumed at a rate to provide a loss on ignition of about 15%. The wet webs were placed on a kettle stand and clamped. A plastic cup was placed onto the sheet and water was added via an addition funnel until the mat touched the surface below it. The amount of water was weighed and recorded. The handsheet conditions that were used to make the wet webs are shown in Table 9 below.

TABLE 9

| Handsheet Conditions | |
|---|---|
| Glass Fiber | 1.25" Owens Corning |
| White Water | Nalco PAA |
| Target Basis Weight | 835 g per 929 $cm^2$ |
| Target Loss on Ignition | 15% |

The handsheets of CExs. 7-9 were all prepared by heating the handsheets to a temperature of about 240° C. for about 10 seconds. The handsheets of Exs. 9 and 10 were prepared by heating the handsheets to a temperature of about 250° C. for about 10 seconds. The handsheets of Exs. 11 and 12 were prepared by heating the handsheets to a temperature of about 260° C. for about 10 seconds. The properties of the handsheets of CExs. 7-9 and Ex. 9-12 are shown in Table 10 below. The property values shown in Table 10 are the average of 4 measurements from each handsheet.

TABLE 10

| Cured Handsheet Product Properties | | | | | | | | |
|---|---|---|---|---|---|---|---|---|
| Binder | Avg. Tear Strength (N) | Tear Strength (N) Std. Dev. | Avg. Dry Tensile (kg/7.62 cm) | Dry Tensile Std. Dev. (kg/7.62 cm) | Avg. Wet Tensile (kg/7.62 cm) | Wet Tensile Std. Dev. (kg/7.62 cm) | Avg. % Hot-Wet | % Hot-Wet Std. Dev. |
| CEx. 7 | 5.164 | 1.258 | 31.0 | 5.2 | 23.3 | 3.7 | 77.2 | 19.2 |
| CEx. 8 | 5.519 | 1.580 | 35.6 | 6.7 | 27.7 | 5.1 | 79.4 | 15.4 |
| Ex. 9 | 5.649 | 1.075 | 39.8 | 3.7 | 24.5 | 6.6 | 61.5 | 16.3 |
| Ex. 11 | 5.146 | 1.176 | 33.4 | 4.7 | 21.7 | 5.5 | 65.7 | 16.4 |
| CEx. 9 | 5.262 | 0.904 | 39.1 | 6.6 | 25.8 | 5.8 | 68.8 | 23.9 |
| Ex. 10 | 6.572 | 2.303 | 37.6 | 3.2 | 23.0 | 5.0 | 61.9 | 17.2 |
| Ex. 12 | 5.203 | 1.187 | 37.2 | 5.7 | 24.1 | 4.5 | 65.7 | 13.5 |

As shown in Table 10, Ex. 10 that included SMA had the greatest tear strength, while all other handsheets had similar tear strength. As also shown in Table 10, Ex. 9 that included latex and CEx. 9 that included SMA had the greatest dry tensile strength, and Ex. 9 had a statistically significant difference as compared to CEx. 7. With regard to wet tensile strength, all examples had similar values. It has been shown that the ideal range for % hot-wet is between 60% and 85% and, as shown in Table 10, the handsheets in all examples fell within this range.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A binder composition, comprising:

a urea-based compound, a bifunctional quaternary ammonium salt; and an aldehyde-based resin, wherein the urea-based compound and the bifunctional quaternary ammonium salt are mixed with one another to produce an aldehyde scavenger that is mixed with the aldehyde-based resin to produce the binder composition, and wherein the aldehyde scavenger has a molar ratio of the urea-based compound to the bifunctional quaternary ammonium salt of about 1.2:1 to about 2.8:1.

2. The binder composition of claim 1, wherein the urea-based compound comprises urea, methylurea, 1,3-dimethyl urea, 1,1-dimethyl urea, 1,1,3-trimethylurea, 1,1,3,3-tetramethylurea, methylolurea, dimethylolurea, trimethylolurea, tetramethylolurea, or a mixture thereof.

3. The binder composition of claim 1, wherein the bifunctional quaternary ammonium salt is selected from the group consisting of: 2-hydroxy-N,N,N-trimethylethanaminium chloride, (2-chloroethyl) trimethylammonium chloride, 2-hydroxy-N,N,N-trimethylethanaminium bromide, diethyl (2-hydroxyethyl) methylammonium bromide, 2-diethylamino ethanol hydrogen bromide, (2-chloroethyl) trimethylammonium bromide, and a mixture thereof.

4. The binder composition of claim 1, wherein the urea-based compound comprises urea, and wherein the bifunctional quaternary ammonium salt comprises 2 -hydroxy-N,N,N-trimethylethanaminium chloride.

5. The binder composition of claim 1, wherein the aldehyde-based resin comprises a urea-formaldehyde resin, a phenol-formaldehyde resin, a phenol-urea-formaldehyde resin, a melamine-formaldehyde resin, a melamine-urea-formaldehyde resin, a melamine-urea-phenol-formaldehyde resin, a resorcinol-formaldehyde resin, a resorcinol-urea-formaldehyde resin, a resorcinol-phenol-formaldehyde resin, a resorcinol-urea-phenol-formaldehyde resin, or a mixture thereof.

6. The binder composition of claim 1, wherein the aldehyde-based resin comprises a urea-formaldehyde resin, and wherein the binder composition has a total formaldehyde to total urea molar ratio of about 1.2:1 to about 0.5:1.

7. The binder composition of claim 1, wherein the binder composition further comprises a liquid medium, and wherein the liquid medium comprises water, methanol, ethylene glycol, glycerol, diethyleneglycol, or a mixture thereof.

8. The binder composition of claim 7, wherein:

the urea-based compound and the bifunctional quaternary ammonium salt are mixed with one another to produce an aldehyde scavenger that is mixed with the aldehyde-based resin to produce the binder composition, a molar ratio of the urea-based compound to the bifunctional quaternary ammonium salt in the aldehyde scavenger is about 1.2:1 to about 2.8:1, and the aldehyde scavenger contains up to about 40 wt % of the liquid medium, based on a combined weight of the urea-based compound, the bifunctional quaternary ammonium salt, and the liquid medium.

9. The binder composition of claim 1, wherein the binder composition comprises about 0.5 wt % to about 50 wt % of the urea-based compound, about 0.5 wt % to about 70 wt % of the bifunctional quaternary ammonium salt, and about 30 wt % to about 95 wt % of the aldehyde-based resin, wherein all weight percent values are based on the combined solids weight of the urea-based compound, the bifunctional quaternary ammonium salt, and the aldehyde-based resin.

10. The binder composition of claim 1, wherein:

the urea-based compound comprises urea, the bifunctional quaternary ammonium salt comprises 2-hydroxy-N,N,N-trimethylethanaminium chloride, and the aldehyde-based resin comprises a urea-formaldehyde resin, a phenol-formaldehyde resin, a phenol-urea-formaldehyde resin, a melamine-formaldehyde resin, a melamine-urea-formaldehyde resin, a melamine-urea-phenol-formaldehyde resin, a resorcinol-formaldehyde resin, a resorcinol-urea-formaldehyde resin, a resorcinol-phenol-formaldehyde resin, a resorcinol-urea-phenol-formaldehyde resin, or a mixture thereof.

11. The binder composition of claim 1, wherein:

the urea-based compound and the bifunctional quaternary ammonium salt are mixed with one another to produce an aldehyde scavenger that is mixed with the aldehyde-based resin to produce the binder composition, a molar ratio of the urea-based compound to the bifunctional quaternary ammonium salt in the aldehyde scavenger is about 1.2:1 to about 2.8:1, and the binder composition comprises about 0.5 wt % to about 95 wt % of the aldehyde scavenger and about 99.5 wt % to about 5 wt % of the aldehyde-based resin, based on a combined solids weight of the aldehyde scavenger and the aldehyde-based resin.

12. The binder composition of claim 1, wherein the binder composition has a storage stability of at least 5 days at a temperature of about 25° C.

13. The binder composition of claim 12, wherein the urea-based compound comprises urea, methylurea, 1,3-dimethyl urea, 1,1-dimethyl urea, 1,1,3-trimethylurea, 1,1,3,3-tetramethylurea, methylolurea, dimethylolurea, trimethylolurea, tetramethylolurea, or a mixture thereof;

wherein the bifunctional quaternary ammonium salt is selected from the group consisting of: 2-hydroxy-N,N,N-trimethylethanaminium chloride, (2-chloroethyl) trimethylammonium chloride, 2-hydroxy-N,N,N-trimethylethanaminium bromide, diethyl (2-hydroxyethyl) methylammonium bromide, 2-diethylamino ethanol hydrogen bromide, (2-chloroethyl) trimethylammonium bromide, and a mixture thereof; and wherein the aldehyde-based resin comprises a urea-formaldehyde resin, a phenol- formaldehyde resin, a phenol-urea-formaldehyde resin, a melamine-formaldehyde resin, a melamine-urea-formaldehyde resin, a melamine-urea-phenol-formaldehyde resin, a resorcinol-formaldehyde resin, a resorcinol-urea-formaldehyde resin, a resorcinol-phenol-formaldehyde resin, a resorcinol-urea-phenol-formaldehyde resin, or a mixture thereof.

14. A resinated substrate, comprising:

a plurality of substrates; and a binder composition comprising a urea-based compound, a bifunctional quaternary ammonium salt, and an aldehyde-based resin, wherein the urea-based compound and the bifunctional quaternary ammonium salt are mixed with one another to produce an aldehyde scavenger that is mixed with the aldehyde-based resin to produce the binder composition, and wherein the aldehyde scavenger has a molar ratio of the urea-based compound to the bifunctional quaternary ammonium salt of about 1.2:1 to about 2.8:1.

15. The resinated substrate of claim 14, wherein the resinated substrate comprises, on a solids basis, about 0.05 wt % to about 60 wt % of a combined amount of the urea-based compound and the bifunctional quaternary ammonium salt, and about 1.5 wt % to about 60 wt % of the aldehyde-based resin, based on a dry weight of the substrates.

16. The resinated substrate of claim 14, wherein the substrates comprise lignocellulosic particles, and wherein the resinated substrate comprises, on a solids basis, about 0.15 wt % to about 6 wt % of a combined amount of the urea-based compound and the bifunctional quaternary ammonium salt and about 4 wt % to about 15 wt % of the aldehyde-based resin, based on a dry weight of the substrates.

17. The reinstated substrate of claim 14, wherein the resinated substrate comprises about 5 wt % to about 24 wt % of water, based on a combined weight of the plurality of substrates, the binder composition, and any water added during preparation of the resinated substrate, and wherein an amount of water attributable to the plurality of substrates is at least 5 wt % of the water, based on the combined weight of the plurality of substrates, the binder composition, and any water added during preparation of the resinated substrate.

18. A composite product, comprising:

a plurality of substrates; and an at least partially cured binder composition, wherein, prior to curing, the binder composition comprises a urea-based compound, a bifunctional quaternary ammonium salt, and an aldehyde-based resin, wherein the urea-based compound and the bifunctional quaternary ammonium salt are mixed with one another to produce an aldehyde scavenger that is mixed with the aldehyde-based resin to produce the binder composition, and wherein the aldehyde scavenger has a molar ratio of the urea-based compound to the bifunctional quaternary ammonium salt of about 1.2:1 to about 2.8:1.

19. The composite product of claim 18, wherein the composite product comprises about 0.003 wt % to about 10.8 wt % of the bifunctional quaternary ammonium salt, based on a dried weight of the composite product.

* * * * *